(12) United States Patent
Kojoh et al.

(10) Patent No.: US 6,521,560 B1
(45) Date of Patent: Feb. 18, 2003

(54) SOLID TITANIUM CATALYST COMPONENT, PROCESS FOR PREPARING SAME, OLEFIN POLYMERIZATION CATALYST CONTAINING SAME, AND OLEFIN POLYMERIZATION PROCESS

(75) Inventors: Shinichi Kojoh, Waki-cho (JP); Mamoru Kioka, Waki-cho (JP)

(73) Assignee: Mitsui Chemicals Inc., Tokyo (JP)

(*) Notice: Subject to any disclaimer, the term of this patent is extended or adjusted under 35 U.S.C. 154(b) by 0 days.

(21) Appl. No.: 09/109,908

(22) Filed: Jul. 2, 1998

Related U.S. Application Data

(63) Continuation of application No. 08/963,200, filed on Nov. 3, 1997, now abandoned, which is a continuation of application No. 08/648,973, filed on May 17, 1996, now abandoned.

(30) Foreign Application Priority Data

May 18, 1995 (JP) .............................. 7-120211

(51) Int. Cl.$^7$ .............................. C08F 4/60; C08F 4/02; B01J 37/00; B01J 31/00

(52) U.S. Cl. .................... 502/104; 502/111; 502/113; 502/115; 502/125; 502/129; 526/128; 526/159

(58) Field of Search ................................ 502/103, 104, 502/111, 114, 115, 118, 125, 126, 127, 152, 172, 113, 129; 526/123.1, 124.2, 124.9, 148, 151, 154, 157, 158, 128, 159

(56) References Cited

U.S. PATENT DOCUMENTS

| | | | |
|---|---|---|---|
| 4,784,983 A | * 11/1988 | Mao et al. | 502/111 |
| 4,980,329 A | 12/1990 | Barbe et al. | 502/111 |
| 5,547,912 A | * 8/1996 | Kataoka et al. | 502/154 |

FOREIGN PATENT DOCUMENTS

| | | | |
|---|---|---|---|
| EP | 0004789 | 10/1979 | |
| EP | 131359 | 1/1985 | ........... 520/125.2 |
| EP | 171155 | 2/1986 | ........... 526/125.2 |
| EP | 0202550 | 11/1986 | |
| EP | 0376084 | 7/1990 | |
| EP | 0407808 | 1/1991 | |
| EP | 0585869 | 3/1994 | |
| SU | 1457813 | 2/1989 | |
| SU | 1614750 | 12/1990 | |

OTHER PUBLICATIONS

Tait, et al., "Comparative Kinetic And Active Centre Studies On . . . ", Macromolecular Symposia, 89, 125–138 (Jan. 1995).

Database, WPI, Derwent Publications Ltd., London, GB; Abstract of Japanese Laid–Open Pat. Appln. Publ. No. 54–131589 (Oct. 12, 1979).

(List continued on next page.)

*Primary Examiner*—Mark L. Bell
*Assistant Examiner*—J. Pasterczyk
(74) *Attorney, Agent, or Firm*—Sherman & Shalloway

(57) ABSTRACT

This invention provides a solid titanium catalyst component which comprises magnesium, titanium, halogen and an electron donor, is free from elimination of titanium when washed with hexane at room temperature, and has a titanium content decrease ratio of less than 15 % by weight when washed with o-dichlorobenzene at 90° C. The catalyst component can be prepared by a process wherein solid titanium (i) which is free from elimination of titanium when washed with hexane at room temperature is contacted with a polar compound having a dipole moment of 0.50 to 4.00 Debye to decrease the titanium content by at least 25 % by weight, whereby a solid titanium catalyst component having a weight ratio of an electron donor to titanium of at least 6 is prepared. Olefin polymerization catalyst containing the solid titanium catalyst component can be used for (co)polymerization of olefins with high activity to obtain a polyolefin of high stereoregularity in decreased quantities of a low stereoregular polyolefin.

7 Claims, 1 Drawing Sheet

OTHER PUBLICATIONS

Pat. Abstracts of Japan, vol. 3, No. 157, (C–068); Abstract of Japanese Laid–Open Pat. Appln. Publ. No. 54–131589 (Oct. 12, 1979).

Pat. Abstracts of Japan., vol. 7, No. 252, (C–194); Abstract of Japanese Laid–Open Pat. Appln. Publ. No. 58–138712 (Aug. 17, 1983).

Database WPI, Derwent Publications, Ltd., London, GB; Abstract of Japanese Laid–Open Pat. Appln. Publ. No. 58–138712 (Aug. 17, 1983).

Database WPI, Derwent Publications, Ltd., London, GB; Abstract of Japanese Laid–Open Pat. Appln. Publ. No. 4–318006 (Nov. 9, 1992).

* cited by examiner

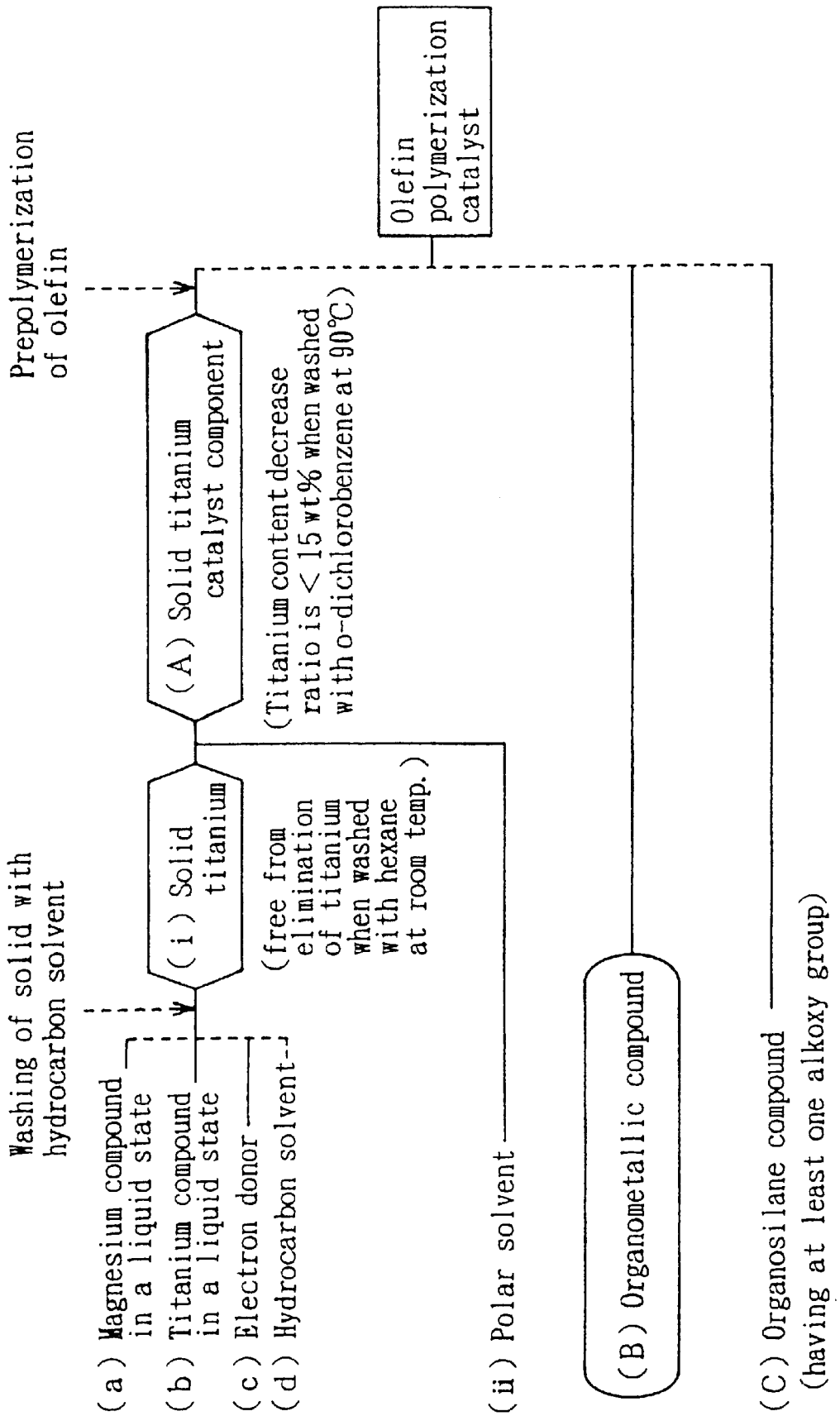

SOLID TITANIUM CATALYST COMPONENT, PROCESS FOR PREPARING SAME, OLEFIN POLYMERIZATION CATALYST CONTAINING SAME, AND OLEFIN POLYMERIZATION PROCESS

CROSS-REFERENCE TO RELATED APPLICATIONS

This application is a continuation of application Ser. No. 08/963,200, filed Nov. 3, 1997 now abandoned; which in turn is a continuation of application Ser. No. 08/648,973, filed May 17, 1996, now abandoned.

FIELD OF THE INVENTION

The present invention relates to a solid titanium catalyst component useful for producing a polyolefin, a process for preparing the solid titanium catalyst component, an olefin polymerization catalyst containing the catalyst component and an olefin polymerization process using the catalyst.

BACKGROUND OF THE INVENTION

Ziegler-Natta catalysts comprising a titanium catalyst component and an organoaluminum compound have been conventionally widely used as catalysts for preparing polyolefins. Above all, catalysts containing a carrier supported solid titanium catalyst component as the titanium catalyst component are known to show high polymerization activities.

It is also known that catalysts containing a magnesium chloride supported titanium catalyst component show high polymerization activities and produce polyolefins of high stereoregularity when olefins such as propylene and butene are polymerized.

Further, there have been proposed various catalysts capable of producing polyolefins of much higher stereoregularity. For instance, there has been proposed a catalyst containing an electron-donative compound (electron donor) as a third component together with a magnesium chloride supported solid titanium catalyst component and an organoaluminum component.

In the polymerization of an olefin using a catalyst containing such a solid titanium catalyst component, however, there is a problem that a polyolefin of low stereoregularity is produced as a by-product in addition to the polyolefin of high stereoregularity. Moreover, there is a limitation on decrease of the amount of the polyolefin of low stereoregularity even if a catalyst for preparing a polyolefin of high stereoregularity, that contains the electron donor as a third component, is used.

The solid titanium catalyst component is prepared by bringing a titanium compound, a magnesium compound, an electron donor, etc. into contact with each other. In the solid titanium catalyst component thus prepared, a surplus titanium compound that causes production of the polyolefin of low stereoregularity is contained. In order to produce a polyolefin of high stereoregularity, the solid titanium catalyst component is desired to contain no surplus titanium compound.

It is known that the surplus titanium compound can be partly eliminated when the solid titanium catalyst component is washed with hexane at room temperature. Further, there has been proposed a process for preparing a solid titanium catalyst component in which the surplus titanium compound is removed from the solid obtained by contacting a titanium compound, a magnesium compound, an electron donor, etc., by the use of a solvent. For instance, Japanese Patent Laid-Open Publication No. 124909/1984 describes that the surplus titanium compound can effectively be washed out with an aromatic hydrocarbon such as toluene.

However, when the solid titanium catalyst component is washed with the aromatic hydrocarbon as described above, the electron donor is also removed together with the surplus titanium compound, and as a result the solid titanium catalyst component cannot exert its full effects to decrease the quantity of the polyolefin of low stereoregularity.

Accordingly, there has been desired development of a solid titanium catalyst component and a catalyst containing it, which can produce a polyolefin of high stereoregularity with high activities as well as in a decreased quantity of a polyolefin of stereoregularity.

OBJECT OF THE INVENTION

The present invention has been made under such circumstances as described above, and it is an object of the invention to provide a solid titanium catalyst component capable of decreasing the quantity of a polyolefin of low stereoregularity as a by-product and producing a polyolefin of high stereoregularity with high activities. It is another object of the invention to provide a process for preparing the solid titanium catalyst component. It is a further object of the invention to provide an olefin polymerization catalyst containing the solid titanium catalyst component, and an olefin polymerization process using the olefin polymerization catalyst.

SUMMARY OF THE INVENTION

The solid titanium catalyst component according to the invention comprises magnesium, titanium, halogen and an electron donor and has the following properties:

(1) the titanium content is not more than 2.5% by weight,
(2) the total content of magnesium and halogen is at least 65% by weight and less than 92% by weight,
(3) the electron donor content is in the range of 8 to 30% by weight,
(4) the weight ratio of the electron donor to titanium is in the range of 7 to 40, and
(5) the solid titanium catalyst component is substantially free from elimination of titanium when washed with hexane at room temperature and has a titanium content decrease ratio of less than 15% by weight when washed with o-dichlorobenzene at 90° C.

The process for preparing a solid titanium catalyst component according to the invention comprises bringing (i) solid titanium which comprises magnesium, titanium, halogen and an electron donor and is free from elimination of titanium when washed with hexane at room temperature, into contact with (ii) a polar compound having a dipole moment of 0.50 to 4.00 Debye at a temperature of at least 40° C. to decrease the titanium content in the solid titanium (i) by at least 25% by weight, so as to prepare a solid titanium catalyst component having a weight ratio of the electron donor to titanium of at least 7.

The polar compound having a dipole moment of 0.50 to 4.00 Debye is preferably a halogen-containing aromatic hydrocarbon.

It is preferred that the solid titanium (i) used in the contact with the polar compound having a dipole moment of 0.50 to 4.00 Debye (ii) has a weight ratio of the electron donor to titanium of not more than 6.

The solid titanium (i) is preferably a solid (1) obtained by bringing (a) a magnesium compound in a liquid state, (b) a titanium compound in a liquid state and (c) an electron donor into contact with each other. This solid titanium (i) may be a solid (2) obtained by further bringing the solid (1) into contact with (b) the titanium compound in a liquid state.

The olefin polymerization catalyst according to the invention comprises (A) the solid titanium catalyst component, (B) an organometallic compound and (C) an organosilane compound having at least one alkoxy group.

Another olefin polymerization catalyst according to the invention is a prepolymerized catalyst obtained by prepolymerizing or precopolymerizing an olefin onto (A) the solid titanium catalyst component described above, (B) an organometallic compound, and optionally, (C) an organosilane compound having at least one alkoxy group.

In the present invention, the olefin polymerization catalyst may be the above-described prepolymerized catalyst alone, or optionally in combination with (B) an organometallic compound and/or (C) an organosilane compound having at least one alkoxy group.

The olefin polymerization process according to the invention comprises polymerizing or copolymerizing an olefin in the presence of any one of the above-described olefin polymerization catalysts. In this process, the olefin can be polymerized with high activities. Moreover, a polyolefin of high stereoregularity can be produced in a decreased quantity of a polyolefin of low stereoregularity produced.

BRIEF DESCRIPTION OF THE DRAWING

The FIGURE shows an example of steps for preparing the solid titanium catalyst component according to the present invention together with an example of steps for preparing the olefin polymerization catalyst according to the present invention.

DETAILED DESCRIPTION OF THE INVENTION

The process for preparing a solid titanium catalyst component, the solid titanium catalyst component, the prepolymerized catalyst containing the solid titanium catalyst component, the olefin polymerization catalyst and the olefin polymerization process according to the invention will be described in detail hereinafter.

The term "polymerization" herein is used to mean not only homopolymerization but also copolymerization, and thus the term "a polymer" is used to mean a homopolymer as well as a copolymer.

Process for preparing solid titanium catalyst component (A)

In the process for preparing a solid titanium catalyst component according to the invention, solid titanium (i) which comprises magnesium, titanium, halogen and an electron donor and is free from elimination of titanium when washed with hexane at room temperature is brought into contact with a polar compound having a dipole moment of 0.50 to 4.00 Debye (ii) at a temperature of at least 40° C. to decrease the titanium content in the solid titanium (i) by at least 25% by weight, whereby a solid titanium catalyst component (A) having a weight ratio of the electron donor to titanium of at least 7 is prepared.

The solid titanium (i) can be prepared by contacting a magnesium compound, a titanium compound, an electron donor, etc. by various methods, and there is no specific limitation on the preparation process. In the invention, however, it is preferred to contact (a) a magnesium compound in a liquid state, (b) a titanium compound in a liquid state and (c) an electron donor with each other to produce a solid as the solid titanium (i).

Each component used for preparing the solid titanium (i) and the process therefor are described below in detail.

(a) Magnesium Compound

In the preparation of the solid titanium (i) in the invention, a magnesium compound in a liquid state is preferably used. The term "a magnesium compound in a liquid state" means not only a magnesium compound which is liquid as such but also a solution of a solid magnesium compound dissolved in a solvent.

The magnesium compound includes those having reduction ability and those having no reduction ability.

The magnesium compound having reduction ability is, for example, an organomagnesium compound represented by the following formula:

$X_n MgR_{2-n}$ wherein n is a number of $0 \leq n < 2$; R is hydrogen, an alkyl group of 1 to 20 carbon atoms, an aryl group of 6 to 21 carbon atoms or a cycloalkyl group of 5 to 20 carbon atoms; when n is 0, two of R may be the same or different; and X is halogen.

Examples of the organomagnesium compounds having reduction ability include:

dialkylmagnesium compounds, such as dimethylmagnesium, diethylmagnesium, dipropylmagnesium, dibutylmagnesium, diamylmagnesium, dihexylmagnesium, didecylmagnesium, octylbutylmagnesium and ethylbutylmagnesium;

alkylmagnesium halides, such as ethylmagnesium chloride, propylmagnesium chloride, butylmagnesium chloride, hexylmagnesium chloride and amylmagnesium chloride; and alkylmagnesium alkoxides, such as butylethoxymagnesium, ethylbutoxymagnesium and octylbutoxymagnesium. Other compounds, such as butylmagnesium hydride may also be used.

Examples of the magnesium compounds having no reduction ability include:

magnesium halides, such as magnesium chloride, magnesium bromide, magnesium iodide and magnesium fluoride;

alkoxymagnesium halides, such as methoxymagnesium chloride, ethoxymagnesium chloride, isopropoxymagnesium chloride, butoxymagnesium chloride and octoxymagnesium chloride;

aryloxymagnesium halides, such as phenoxymagnesium chloride and methylphenoxymagnesium chloride;

alkoxymagnesiums, such as ethoxymagnesium, isopropoxymagnesium, butoxymagnesium, n-octoxymagnesium and 2-ethylhexoxymagnesium;

aryloxymagnesiums, such as phenoxymagnesium and dimethylphenoxymagnesium; and magnesium carboxylates, such as magnesium laurate and magnesium stearate. Also employable are magnesium metal and magnesium hydrides.

The magnesium compounds having no reduction ability may be derived from the aforementioned magnesium compounds having reduction ability or derived in si tu in the preparation of a catalyst component. For example, magnesium compounds having reduction ability may be brought into contact with polysiloxane compounds, halogen-containing silane compounds, halogen-containing aluminum compounds, esters, alcohols, halogen-containing compounds or compounds having OH group or active carbon-to-oxygen bond to obtain magnesium compound having no reduction ability.

The magnesium compound having reduction ability or the magnesium compound having no reduction ability may form complex compounds or double compounds together with the later-described organometallic compounds of other metals, e.g., aluminum, zinc, boron, beryllium, sodium and potassium, or may be a mixture together with other metallic compounds. The magnesium compounds mentioned above may be used singly or in combination of two or more kinds.

For preparing the solid titanium (i), magnesium compounds other than those mentioned above may also be employed, but it is preferred that the magnesium compound is present in the form of a halogen-containing magnesium compound in the finally obtained solid titanium (i). Therefore, when a magnesium compound containing no halogen is used, the magnesium compound is preferably contacted with a halogen-containing compound on the way to prepare the solid titanium (i)

Of the above compounds, magnesium compounds having no reduction ability, particularly halogen-containing magnesium compounds, more particularly magnesium chloride, alkoxymagnesium chloride and aryloxymagnesium chloride are preferred.

When a solid magnesium compound is used out of the above-mentioned magnesium compounds, it can be rendered to be in a liquid state using an electron donor (c-i).

Examples of the electron donor (c-i) include alcohols, phenols, ketones, aldehydes, ethers, amines and pyridines, which will be described later as examples of an electron donor (c).

Also employable are metallic acid esters, such as tetraethoxytitanium, tetra-n-propoxytitanium, tetra-i-propoxytitanium, tetrabutoxytitanium, tetrahexoxytitanium, tetrabutoxyzirconium and tetraethoxyzirconium.

Of these, particularly preferred are alcohols and metallic acid esters.

The solubilization reaction of the solid magnesium compound by the electron donor (c-i) is generally carried out by bringing the solid magnesium compound into contact with the electron donor (c-i), followed by heating if necessary. This contact may be carried out at a temperature of usually 0 to 200° C., preferably 20 to 180° C., more preferably 50 to 150° C.

The solubilization reaction may also be carried out in the presence of a hydrocarbon solvent (d). Examples of the hydrocarbon solvents include aliphatic hydrocarbons, such as pentane, hexane, heptane, octane, decane, dodecane, tetradecane and kerosene; alicyclic hydrocarbons, such as cyclopentane, methylcyclopentane, cyclohexane, methylcyclohexane, cyclooctane and cyclohexene; halogenated hydrocarbons, such as dichloroethane, dichloropropane, trichloroethylene and chlorobenzene; and aromatic hydrocarbons, such as benzene, toluene and xylene.

(b) Titanium Compound

In the present invention, a tetravalent titanium compound is preferably used as the titanium compound (b) in a liquid state. The tetravalent titanium compound is, for example, a compound represented by the following formula:

$$Ti(OR)_g X_{4-g}$$

wherein R is a hydrocarbon group of 1 to 15 carbon atoms, X is a halogen atom, and $0 \leq g \leq 4$.

Examples of such compounds include:

titanium tetrahalides, such as $TiCl_4$, $TiBr_4$ and $TiI_4$;

alkoxytitanium trihalides, such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iso\text{-}C_4H_9)Br_3$;

dialkoxytitanium dihalides, such as $Ti(OCH_3)_2Cl_2$, $Ti(OC_2H_5)_2Cl_2$, $Ti(O\text{-}n\text{-}C_4H_9)_2Cl_2$ and $Ti(OC_2H_5)_2Br_2$;

trialkoxytitanium monohalides, such as $Ti(OCH_3)_3Cl$, $Ti(OC_2H_5)_3Cl$, $Ti(O\text{-}n\text{-}C_4H_9)_3Cl$ and $Ti(OC_2H_5)_3Br$; and tetraalkoxytitaniums, such as $Ti(OCH_3)_4$, $Ti(OC_2H_5)_4$, $Ti(O\text{-}n\text{-}C_4H_9)_4$, $Ti(O\text{-}iso\text{-}C_4H_9)_4$ and $Ti(O\text{-}2\text{-}ethylhexyl)4$.

Of these, preferred are titanium tetrahalides, and particularly preferred is titanium tetrachloride. These titanium compounds can be used singly or in combination. Further, these titanium compounds may be diluted with hydrocarbons, halogenated hydrocarbons or aromatic hydrocarbons, prior to use.

(c) Electron Donor

Examples of the electron donor (c) used for preparing the solid titanium (i) include alcohols, phenols, ketones, aldehydes, carboxylic acid, organic acid halides, organic or inorganic acid esters, ethers, acid amides, acid anhydrides, ammonia, amines, nitrites, isocyanates, nitrogen-containing cyclic compounds and oxygen-containing cyclic compounds. More specifically, there can be mentioned:

alcohols having 1 to 18 carbon atoms, such as methanol, ethanol, propanol, butanol, pentanol, hexanol, 2-ethylhexanol, octanol, dodecanol, octadecyl alcohol, oleyl alcohol, benzyl alcohol, phenylethyl alcohol, cumyl alcohol, isopropyl alcohol and isopropylbenzyl alcohol;

halogen-containing alcohols having 1 to 18 carbon atoms, such as trichloromethanol, trichloroethanol and trichlorohexanol;

phenols having 6 to 20 carbon atoms which may have a lower alkyl group, such as phenol, cresol, xylenol, ethylphenol, propylphenol, nonylphenol, cumylphenol and naphthol;

ketones having 3 to 15 carbon atoms, such as acetone, methyl ethyl ketone, methyl isobutyl ketone, acetophenone, benzophenone and benzoquinone;

aldehydes having 2 to 15 carbon atoms, such as acetaldehyde, propionaldehyde, octylaldehyde, benzaldehyde, tolualdehyde and naphthaldehyde;

organic acid esters having 2 to 30 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarboxylate, methyl benzoate, ethyl benzoate, propyl benzoate, butyl benzoate, octyl benzoate, cyclohexyl benzoate, phenyl benzoate, benzyl benzoate, methyl toluate, ethyl toluate, amyl toluate, ethyl ethylbenzoate, methyl anisate, ethyl anisate, ethyl ethoxybenzoate, γ-butyrolactone, δ-valerolactone, coumarin, phthalide, dimethyl carbonate and ethyl carbonate;

acid halides having 2 to 15 carbon atoms, such as acetyl chloride, benzoyl chloride, toluyl chloride and anisoyl chloride;

ethers having 2 to 20 carbon atoms, such as methyl ether, ethyl ether, isopropyl ether, butyl ether, amyl ether, tetrahydrofuran, anisole and diphenyl ether;

acid amides, such as N,N-dimethylacetamide, N,N-diethylbenzamide and N,N-dimethyltoluamide;

amines, such as methylamine, ethylamine, dimethylamine, diethylamine, trimethylamine, triethylamine, tributylamine, tribenzylamine, tetramethylenediamine and hexamethylenediamine;

nitriles, such as actonitrile, benzonitrile and tolunitrile;

acid anhydrides, such as acetic anhydride, phthalic anhydride and benzoic anhydride;

pyrroles, such as pyrrole, methylpyrrole and dimethylpyrrole;

pyrrolines;

pyrrolidines;

indoles;

pyridines, such as pyridine, methylpyridine, ethylpyridine, propylpyridine, dimethylpyridine, ethylmethylpyridine, trimethylpyridine, phenylpyridine, benzylpyridine and chloropyridine;

nitrogen-containing cyclic compounds, such as piperidines, quinolines and isoquinolines; and oxygen-containing cyclic compounds, such as tetrahydrofuran, 1,4-cineole, 1,8-cineole, pinolfuran, methylfuran, dimethylfuran, diphenylfuran, benzofuran, coumaran, phthalan, tetrahydropyran, pyran and dihydropyran.

Further, ethers of polyhydroxy compounds such as 1-methoxyethanol, 2-methoxyethanol, 4-methoxybutanol and 2-butoxyethanol can be mentioned as preferred examples of the electron donor (c).

Preferred examples of the organic acid esters include polycarboxylic esters having structures represented by the following formulae:

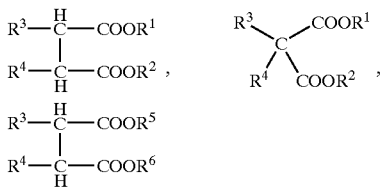

In the above formulae, $R^1$ is a substituted or unsubstituted hydrocarbon group, $R^2$, $R^5$ and $R^6$ are each hydrogen or a substituted or unsubstituted hydrocarbon group, $R^3$ and R4 are each hydrogen or a substituted or unsubstituted hydrocarbon group, and at least one of $R^3$ and $R^4$ is a substituted or unsubstituted hydrocarbon group. $R^3$ and $R^4$ may be linked to each other to form a cyclic structure. When the hydrocarbon groups $R^1$ to $R^6$, which may have 1 to 15 carbon atoms, are substituted, the substituents contain hetero atoms such as N, 0 and S and have groups such as C—O—C—, COOR, COOH, OH, SO$_3$H, —C—N—C— and NH$_2$.

Particular examples of the polycarboxylic esters include:

aliphatic polycarboxylic esters, such as diethyl succinate, dibutyl succinate, diethyl methylsuccinate, diisobutyl α-methylglutarate, diethyl methylmalonate, diethyl ethylmalonate, diethyl isopropylmalonate, diethyl butylmalonate, diethyl phenylmalonate, diethyl diethylmalonate, diethyl dibutylmalonate, monooctyl maleate, dioctyl maleate, dibutyl maleate, dibutyl butylmaleate, diethyl butylmaleate, diisopropyl β-methylglutarate, diallyl ethylsuccinate, di-2-ethylhexyl fumarate, diethyl itaconate and dioctyl citraconate;

alicyclic polycarboxylic esters, such as diethyl 1,2-cyclohexanecarboxylate, diisobutyl 1,2-cyclohexanecarboxylate, diethyl tetrahydrophthalate and diethyl nadiate;

aromatic polycarboxylic esters, such as monoethyl phthalate, dimethyl phthalate, methylethyl phthalate, monoisobutyl phthalate, diethyl phthalate, ethylisobutyl phthalate, di-n-propyl phthalate, diisopropyl phthalate, di-n-butyl phthalate, diisobutyl phthalate, di-n-heptyl phthalate, di-2-ethylhexyl phthalate, di-n-octyl phthalate, dineopentyl phthalate, didecyl phthalate, benzylbutyl phthalate, diphenyl phthalate, diethyl naphthalenedicarboxylate, dibutyl naphthalenedicarboxylate, triethyl trimellitate and dibutyl trimellitate; and heterocyclic polycarboxylic esters, such as ethanol, n-butanol, i-butanol and 2-ethylhexanol esters of 3,4-furandicarboxilic acid.

Other examples of the polycarboxylic esters are esters of long chain dicarboxylic acids, such as diethyl adipate, diisobutyl adipate, diisopropyl sebacate, di-n-butyl sebacate, di-n-octyl sebacate and di-n-ethylhexyl sebacate.

In the present invention, a polyether compound having two or more ether linkages present through plural atoms can also be used as the electron donor (c).

The polyether compound is, for example, a compound which has two or more atoms selected from carbon, silicon, oxygen, nitrogen, phosphorus, boron and sulfur as the atoms present between the ether linkages. Of such compounds, preferred are those in which the atoms present between the two or more ether linkages have relatively bulky substituents and include plural carbon atoms.

Examples of such polyether compounds include those represented by the following formula:

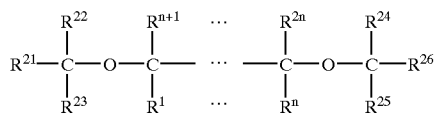

wherein n is an integer of $2 \leq n \leq 10$, $R^1$ to $R^{26}$ are each a substituent having at least one element selected from carbon, hydrogen, oxygen, halogen, nitrogen, sulfur, phosphorus, boron and silicon, an arbitrary combination of $R^1$ to $R^{26}$, preferably $R^1$ to $R^2n$, may form together a ring other than a benzene ring, and the main chain may contain an atom other than carbon.

Of such compounds, preferably used are 1,3-diethers, and particularly preferably used are:

2,2-diisobutyl-1,3-dimethoxypropane, 2-isopropyl-2-isobutyl-1,3-dimethoxypropane, 2-isopropyl-2-isopentyl-1,3-dimethoxypropane, 2,2-dicyclohexyl-1,3-dimethoxypropane, 2,2-bis(cyclohexylmethyl)-1,3-dimethoxypropane, 2-cyclohexyl-2-isopropyl-1,3-dimethoxypropane, 2-isopropyl-2-s-butyl-1,3-dimethoxypropane, 2,2-diphenyl-1,3-dimethoxypropane, and 2-cyclopentyl-2-isopropyl-1,3-dimethoxypropane.

The later-described organosilane compound (C) having at least one alkoxy group, water and anionic, cationic or nonionic surface active agents are also employable as the electron donor (c).

Of the above compounds, the carboxylic esters are preferably used as the electron donor (c). Among them, the polycarboxylic esters and the esters of polyhydroxy compounds, particularly phthalic esters, the ethers of aliphatic polyhydroxy compounds and the acid anhydrides are preferred.

These electron donors (c) may be used singly or in combination.

Preparation of Solid Titanium (i)

In the present invention, the solid titanium (i) can be prepared from (a) the magnesium compound in a liquid state, (b) the titanium compound in a liquid state and (c) the electron donor, as described above. In the contact of these components, the titanium compound (b) in a liquid state may be used once to produce a solid (1), or the resulting solid (1) may further be contacted with the titanium compound (b) in a liquid state to produce a solid (2).

In the contact of the components (a) to (c) to prepare the solid, such a hydrocarbon solvent (d) as used for the preparation of the magnesium compound (a) in a liquid state can be used, if necessary.

In the present invention, the solid (1) or (2) obtained by the contact of the components (a) to (c) can be directly used as the solid titanium (i) that is to be contacted with a polar compound having a dipole moment of 0.50 to 4.00 Debye (ii), but it is preferred that the solid (1) or (2) is washed with a hydrocarbon solvent prior to use.

In the preparation of the solid titanium (i), organic or inorganic compounds containing silicon, phosphorus, aluminum, etc. may be used as carriers or reaction assistants in addition to the above compounds (a) to (c).

Examples of the carriers include $Al_2O_3$, $SiO_2$, $B_2O_3$, MgO, CaO, $TiO_2$, ZnO, $SnO_2$, BaO, ThO and resins, such as a styrene-divinylbenzene copolymer. Of these, $TiO_2$, $Al_2O_3$, $SiO_2$ and a styrene-divinylbenzene copolymer are preferably used.

For example, the solid (1) or (2) (or the solid titanium (i)) can be prepared from the above components by the following processes, wherein a step of preparing the magnesium compound (a) in a liquid state is also included, and organoaluminum compounds such as those mentioned later in the description of the organometallic compound (B) may be used.

(1) The magnesium compound (a) in a liquid state, which comprises a magnesium compound, the electron donor (c-i) and a hydrocarbon solvent, is contacted with the titanium compound (b) in a liquid state, during or after contacting with an organoaluminum compound to precipitate a solid.

In this process, the electron donor (c) is contacted with the contact product at least once.

(2) A contact product of an inorganic carrier and the organomagnesium compound (a) in a liquid state is contacted with the titanium compound (b) in a liquid state and the electron donor (c).

In this process, the contact product of the inorganic carrier and the organomagnesium compound (a) in a liquid state may be previously contacted with a halogen-containing compound and/or an organoaluminum compound.

(3) An inorganic or organic carrier and the magnesium compound (a) in a liquid state which comprises a magnesium compound, the electron donor (c-i) and optionally a hydrocarbon solvent are mixed to support a magnesium compound on the carrier, followed by contacting with the titanium compound (b) in a liquid state.

In this process, the electron donor (c) is contacted with the contact product at least once.

(4) A solution containing a magnesium compound, the titanium compound (b) in a liquid state and optionally the electron donor (c-i) and/or a hydrocarbon solvent is contacted with an inorganic or organic carrier and the electron donor (c).

(5) The organomagnesium compound (a) in a liquid state is contacted with the titanium compound (.b) in a liquid state and then with the electron donor (c).

(6) The organomagnesium compound (a) in a liquid state is contacted with a halogen-containing compound and then with the titanium compound (b) in a liquid state.

In this process, the electron donor (c) is used at least once.

(7) The alkoxy-containing magnesium compound (a) is contacted with the titanium compound (b) in a liquid state and the electron donor (c).

(8) A solution of a complex of a magnesium compound and the electron donor (c-i) in a hydrocarbon solvent i.e., the magnesium compound (a) in a liquid state, is contacted with the titanium compound (b) in a liquid state and the electron donor (c).

(9) A liquid complex of a magnesium compound and the electron donor (c-i), i.e., the magnesium compound (a) in a liquid state, is contacted with an organoaluminum compound and then contacted with the titanium compound (b) in a liquid state.

In this process, the electron donor (c) is contacted with the contact product at least once.

(10) The magnesium compound (a) having no reduction ability and in a liquid state is contacted with the titanium compound (b) in a liquid state in the presence or absence of the electron donor (c).

In this process, the electron donor (c) is contacted with the contact product at least once.

(11) A reaction product (solid (1)) obtained by any of the processes (1) to (10) is contacted with the titanium compound (b) in a liquid state.

(12) A reaction product (solid (1)) obtained by any of the processes (1) to (10) is contacted with the electron donor (c) and the titanium compound (b) in a liquid state.

The contact of the components may be carried out at a temperature of usually −70 to +200° C., preferably −50 to +150° C., more preferably −30 to +130° C.

The amounts of the components used for preparing the solid titanium (i) vary depending on the process used, and cannot be decided indiscriminately. However, for example, the electron donor (c) can be used in an amount of 0.01 to 10 mol, preferably 0.1 to 5 mol and the titanium compound (b) can be used in an amount of 0.01 to 1,000 mol, preferably 0.1 to 200 mol, both based on 1 mol of the magnesium compound.

In the present invention, it is preferred to produce the solid (1) by the above process (8) or to produce the solid (2) by the above process (11) or (12) which includes the process (8). It is particularly preferred to produce the solid (1) by the process (8).

Since the olefin polymerization catalyst containing the solid (1) can exhibit high activity in the homopolymerization of propylene and can provide propylene random copolymers having a reduced content of decane solubles, the solid (1) is preferred.

In these processes, when the magnesium compound (a) in a liquid state, prepared from a magnesium compound and the electron donor (c-i), is contacted with the titanium compound (b) in a liquid state and then with the electron donor (c), polycarboxylic esters and/or ethers of polyhydroxy compounds are preferably used as the electron donor (c).

In the present invention, the solid (1) or (2) obtained as above can be used directly as the solid titanium (i), but it is preferred to wash it with a hydrocarbon solvent at 0 to 150° C.

Examples of the hydrocarbon solvents include aliphatic hydrocarbon solvents, such as hexane, heptane, octane, nonane, decane and cetane; halogen-free aromatic hydrocarbon solvents, such as toluene, xylene and benzene; and halogen-containing aromatic hydrocarbon solvents which will be described later. Of these, preferably used are aliphatic hydrocarbon solvents and halogen-free hydrocarbon solvents.

For washing the solid, the hydrocarbon solvent may be used in an amount of usually 10 to 500 ml, preferably 20 to 100 ml, based on 1 g of the solid.

The solid titanium (i) obtained as above comprises magnesium, titanium, halogen and an electron donor, and preferably has a weight ratio of the electron donor to titanium of not more than 6.

The solid titanium (i) is free from elimination of titanium when washed with hexane at room temperature.

Contact treatment with polar compound (ii)

In the present invention, the solid titanium (i) is brought into contact with a polar compound (ii) having a dipole moment of 0.50 to 4.00 Debye to prepare a solid titanium catalyst component (A).

Examples of the polar compounds (ii) having a dipole moment of 0.50 to 4.00 Debye (referred to simply as polar compounds) used for the contact with the solid titanium (i) include halogen-containing aromatic hydrocarbons such as chlorobenzene, o-dichlorobenzene, m-dichlorobenzene, trichlorobenzene, α,α,α-trichlorotoluene, o-chlorotoluene, benzyl chloride and 2-chlorobenzyl chloride; halogen-containing aliphatic hydrocarbons such as 1,2-dichloroethane, 1,1,2,2-tetrachloroethane, 1-chloropropane, 2-chloropropane, 1,2-dichloropropane, 1-chlorobutane, 2-chlorobutane, 1-chloro-2-methylpropane, 2-chloro-2-methylpropane and 1-chloropentane; and halogen-containing Si compounds such as diphenyldichlorosilane and methyltrichlorosilane. Of these, halogen-containing aliphatic hydrocarbons are preferred.

The contact of the solid titanium (i) with the polar compound (ii) may be carried out at a temperature of usually 40 to 200° C., preferably 50 to 180° C., more preferably 60 to 160° C., for 1 minute to 10 hours, preferably 10 minutes to 5 hours.

In this contact, the polar compound (ii) may be used in an amount of usually 1 to 10,000 ml, preferably 5 to 5,000 ml, more preferably 10 to 1,000 ml, per 1 g of the solid titanium (i).

The contact of the solid titanium (i) with the polar compound (ii) is preferably performed in an inert gas atmosphere with stirring. For instance, in a glass flask equipped with a stirrer and thoroughly purged with nitrogen, a slurry of the solid titanium (i) and the polar compound (ii) is stirred at the above-mentioned temperature for the above-mentioned period of time at 100 to 1,000 rpm, preferably 200 to 800 rpm, to contact the solid titanium (i) with the polar compound (ii).

The solid titanium (i) and the polar compound (ii) after the contact procedure can be separated from each other by filtration.

By virtue of the contact of the solid titanium (i) with the polar compound (ii), a solid titanium catalyst component having a titanium content lower than that of the solid titanium (i) can be obtained. More specifically, there can be obtained a solid titanium catalyst component (A) in which the titanium content in the solid titanium (i) is decreased by at least 25% by weight, preferably by 30 to 95% by weight, more preferably by 40 to 90% by weight, can be obtained.

The solid titanium catalyst component (A) of the invention obtained as above comprises magnesium, titanium, halogen and an electron donor, and satisfies the following properties.

(1) The titanium content of the solid titanium catalyst component (A) is not more than 2.5% by weight, preferably 2.2 to 0.1% by weight, more preferably 2.0 to 0.2% by weight, particularly preferably 1.8 to 0.3% by weight, especially 1.4 to 0.4% by weight.

(2) The total content of magnesium and halogen is at least 65% by weight and less than 92% by weight.

(3) The electron donor content is in the range of 8 to 30% by weight.

(4) The weight ratio of the electron donor to titanium is at least 7, preferably 7.5 to 35, more preferably 8 to 30, particularly preferably 8.5 to 25.

(5) The solid titanium catalyst component (A) is substantially free from elimination of titanium when washed with hexane at room temperature. Washing of the solid titanium catalyst component with hexane means that the solid titanium catalyst component is washed with hexane of usually 10 to 500 ml, preferably 20 to 100 ml, based on 1 g of the solid titanium catalyst component, for 5 minutes. The room temperature is 15 to 25° C.

The amounts of the magnesium, halogen, titanium and electron donor herein are each in % by weight based on a unit weight of the solid titanium catalyst component (A), and the magnesium, halogen and titanium are determined by inductively coupled plasma spectroscopy (ICP method) and the electron donor is determined by gas chromatography.

Further, the solid titanium catalyst component (A) has a titanium content decrease ratio of less than 15% by weight, preferably less than 10% by weight, when the component (A) is washed with o-dichlorobenzene at 90° C. Washing of the solid titanium catalyst component (A) with o-dichlorobenzene means that 0.5 g of the solid titanium catalyst component (A) is contacted with 100 ml of o-dichlorobenzene at 90° C. for 1 hour.

By the use of the solid titanium catalyst component (A) of the invention as an olefin polymerization catalyst component, an olefin can be polymerized with high activities. Moreover, the quantity of a polyolefin of low stereoregularity produced as a by-product can be decreased and a polyolefin of high stereoregularity can be produced.

(B) Organometallic Compound

In the preparation of the olefin polymerization catalyst of the invention, an organometallic compound is used together with the solid titanium catalyst component (A). The organometallic compound is preferably an organometallic compound containing a metal selected from Group I to Group III of the periodic table, for example an organoaluminum compound, an alkyl complex compound of Group I metal and aluminum, and an organometallic compound of Group II metal.

The organoaluminum compound is represented by, for example, the following formula:

$$R^a{}_nAlX_{3-n}$$

wherein $R^a$ is a hydrocarbon group of 1 to 12 carbon atoms, X is halogen or hydrogen, and n is 1 to 3.

In the above formula, $R^a$ is a hydrocarbon group of 1 to 12 carbon atoms, e.g., an alkyl group, a cycloalkyl group or an aryl group. Particular examples thereof include methyl, ethyl, n-propyl, isopropyl, isobutyl, pentyl, hexyl, octyl, cyclopentyl, cyclohexyl, phenyl and tolyl. Examples of such organoaluminum compounds include:

trialkylaluminums, such as trimethylaluminum, triethylaluminum, triisopropylaluminum, triisobutylaluminum, trioctylaluminum and tri-2-ethylhexylaluminum;

alkenylaluminums, such as isoprenylaluminum;

dialkylaluminum halides, such as dimethylaluminum chloride, diethylaluminum chloride, diisopropylaluminum chloride, diisobutylaluminum chloride and dimethylaluminum bromide;

alkylaluminum sesquihalides, such as methylaluminum sesquichloride, ethylaluminum sesquichloride, isopropylaluminum sesquichloride, butylaluminum sesquichloride and ethylaluminum sesquibromide;

alkylaluminum dihalides, such as methylaluminum dichloride, ethylaluminum dichloride, isopropylaluminum dichloride and ethylaluminum dibromide; and alkylaluminum hydrides, such as diethylaluminum hydride and diisobutylaluminum hydride.

Also employable as the organoaluminum compound is a compound represented by the following formula:

$$R^a{}_nAlY_{3-n}$$

wherein $R^a$ is the same as above; Y is —ORb group, —OSiR$^c{}_3$ group, —OAlR$^d{}_2$ group, —NR$^e{}_2$ group, —SiR$^f{}_3$ group or —N(R$^g$)AlR$^h{}_2$ group; n is 1 to 2; R$^b$, R$^c$, R$^d$ and R$^h$ are each methyl, ethyl, isopropyl, isobutyl, cyclohexyl, phenyl or the like; R$^e$ is hydrogen, methyl, ethyl, isopropyl, phenyl, trimethylsilyl or the like; and Rf and Rg are each methyl, ethyl or the like.

Examples of such organoaluminum compounds include:

(i) compounds of the formula $R^a{}_nAl(OR^b)_{3-n}$, e.g., dimethylaluminum methoxide, diethylaluminum ethoxide and diisobutylaluminum methoxide;

(ii) compounds of the formula $R^a{}_nAl(OSiR^c)_{3-n}$, e.g., Et$_2$Al(OSiMe$_3$), (iso-Bu)$_2$Al(OSiMe$_3$) and (iso-Bu)$_2$Al(OSiEt$_3$);

(iii) compounds of the formula $R^a{}_nAl(OAlR^d{}_2)_{3-n}$, e.g., Et$_2$AlOAlEt$_2$ and (iso-Bu)$_2$AlOAl(iso-Bu) 2;

(iv) compounds of the formula $R^a{}_nAl(NR^e{}_2)_{3-n}$, e.g., Me$_2$AlNEt$_2$, Et$_2$AlNHMe, Me$_2$AlNHEt, Et$_2$AlN(Me$_3$Si)$_2$ and (iso-Bu)$_2$AlN(Me$_3$Si)$_2$;

(v) compounds of the formula $R^a{}_nAl(SiR^f{}_2)_{3-n}$, e.g., (iso-Bu)$_2$AlSiMe$_3$; and (vi) compounds of the formula $R^a{}_nAl[N(R^g)AlR^h{}_2]_{3-n}$, e.g., Et$_2$AlN(Me)-AlEt$_2$ and (iso-Bu)$_2$AlN(Et)Al(iso-Bu)$_2$.

Further, compounds analogous to the above compounds, for example, organoaluminum compounds wherein two or more aluminum atoms are linked through an oxygen atom or a nitrogen atom, are also employable. Examples of such compounds include (C$_2$H$_5$)$_2$AlOAl(C$_2$H$_5$)$_2$, (C$_4$H$_9$)$_2$AlOAl(C$_4$H$_9$)$_2$ and (C$_2$H$_5$)$_2$AlN(C$_2$H$_5$) Al (C$_2$H$_5$)$_2$.

Furthermore, aluminoxanes such as methylaluminoxane are also employable.

Of the organoaluminum compounds mentioned above, preferred are those represented by the formulae $R^a{}_3Al$, $R^a{}_nAl(OR^b)_{3-n}$ and $R^a{}_nAl(OAlR^d{}_2)_{3-n}$.

The alkyl complex compound of Group I metal and aluminum is represented by the following formula:

$$M^1AlR^j{}_4$$

wherein $M^1$ is Li, Na or K, and $R^j$ is a hydrocarbon group of 1 to 15 carbon atoms. Examples of such compounds include LiAl (C$_2$H$_5$)$_4$ and LiAl (C$_7$Hl$_5$)$_4$.

The organometallic compound of Group II metal is represented by the following formula:

$$R^kR^1M^2$$

wherein $R^k$ and $R^1$ are each a hydrocarbon group of 1 to 15 carbon atoms or halogen, $R^k$ and $R^1$ may be the same or different with the exception that both of them are halogens, and $M^2$ is Mg, Zn or Cd.

Examples of such compounds include diethylzinc, diethylmagnesium, butylethylmagnesium, ethylmagnesium chloride and butylmagnesium chloride.

The compounds mentioned above may be used singly or in combination.

(C) Organosilane Compound

In the preparation of the olefin polymerization catalyst of the invention, an organosilane compound having at least one alkoxy group is used together with the solid titanium catalyst component (A) and the organometallic compound (B). The organosilane compound can be represented by the following formula (c):

$$R_nSi(OR')_{4-n} \quad (C)$$

wherein R and R' are each a hydrocarbon group of 1 to 20 carbon atoms, and n is 1, 2 or 3.

Examples of the organosilane compounds include trimethylmethoxysilane, trimethylethoxysilane, dimethyldimethoxysilane, dimethyldiethoxysilane, diisopropyldimethoxysilane, t-butylmethyldimethoxysilane, t-butylmethyldiethoxysilane, t-amylmethyldiethoxysilane, diphenyldimethoxysilane, phenylmethyldimethoxysilane, di.phenyldiethoxysilane, bis-o-tolyldimethoxysilane, bis-m-tolyldimethoxysilane, bis-p-tolyldimethoxysilane, bis-p-tolyldiethoxysilane, bisethylphenyldimethoxysilane, ethyltrimethoxysilane, ethyltriethoxysilane, vinyltrimethoxysilane, methyltrimethoxysilane, n-proyltriethoxysilane, decyltrimethoxysilane, decyltriethoxysilane, phenyltrimethoxysilane, γ-chloropropyltrimethoxysilane, methyltriethoxysilane, ethyltriethoxysilane, vinyltriethoxysilane, n-butyltriethoxysilane, phenyltriethoxysilane, γaminopropyltriethoxysilane, chlorotriethoxysilane, ethyltriisopropoxysilane, vinyltributoxysilane, trimethylphenoxysilane, methyltriallyloxysilane, vinyltris(β-methoxyethoxysilane), vinyltriacetoxysilane and dimethyltetraethoxydisiloxane.

Ethyl silicate and butyl silicate are also employable.

In the present invention, the organosilane compound of the formula (c) is preferably represented by the following formula (c-i):

$$R^a{}_n Si(OR^b)_{4-n} \quad \text{(c-i)}$$

wherein n is 1, 2 or 3; when n is 1, $R^a$ is a secondary or tertiary hydrocarbon group of 1 to 20 carbon atoms; when n is 2 or 3, at least one of $R^a$ is a secondary or tertiary hydrocarbon group, $R^a$ may be the same or different; $R^b$ is a hydrocarbon group of 1 to 4 carbon atoms; when 4-n is 2 or 3, $OR^b$ may be the same or different.

In the organosilane compound of the formula (c-i) having a bulky group, the secondary or tertiary hydrocarbon group includes cyclopentyl, cyclopentenyl and cyclopentadienyl, which may be substituted, and hydrocarbon groups wherein the carbon adjacent to Si is secondary or tertiary.

Examples of the substituted cyclopentyl groups include cyclopentyl groups having alkyl groups, such as 2-mehtylcyclopentyl, 3-methylcyclopentyl, 2-ethylcyclopentyl, 2-n-butylcyclopentyl, 2,3-dimethylcyclopentyl, 2,4-dimethylcyclopentyl, 2,5-dimethylcyclpentyl, 2,3-diethylcyclopentyl, 2,3,4-trimethylcyclopentyl, 2,3,5-trimethylcyclopentyl, 2,3,4-triethylcyclopentyl, tetramethylcyclopentyl and tetraethylcyclopentyl.

Examples of the substituted cyclopentenyl groups include cyclopentenyl groups having alkyl groups, such as 2-mehtylcyclopentenyl, 3-methylcyclopentenyl, 2-ethylcyclopentenyl, 2-n-butylcyclopentenyl, 2,3-dimethylcyclopentenyl, 2,4-dimethylcyclopentenyl, 2,5-dimethylcyclpentenyl, 2,3,4-trimethylcyclopentenyl, 2,3,5-trimethylcyclopentenyl, 2,3,4-triethylcyclopentenyl, tetramethylcyclopentenyl and tetraethylcyclopentenyl.

Examples of the substituted cyclopentadienyl groups include cyclopentadienyl groups having alkyl groups, such as 2-mehtylcyclopentadienyl, 3-methylcyclopentadienyl, 2-ethylcyclopentadienyl, 2-n-butylcyclopentadienyl, 2,3-dimethylcyclopentadienyl, 2,4-dimethylcyclopentadienyl, 2,5-dimethylcyclpentadienyl, 2,3-diethylcyclopentadienyl, 2,3,4-trimethylcyclopentadienyl, 2,3,5-trimethylcyclopentadienyl, 2,3,4-triethylcyclopentadienyl, 2,3,4,5-tetramethylcyclopentadienyl, 2,3,4,5-tetraethylcyclopentadienyl, 1,2,3,4,5-pentamethylcyclopentadienyl and 1,2,3,4,5-pentaethylcyclopentadienyl.

Examples of the hydrocarbon groups wherein the carbon adjacent to Si is secondary carbon include i-propyl, s-butyl, s-amyl and α-methylbenzyl. Examples of the hydrocarbon groups wherein the carbon adjacent to Si is tertiary carbon include t-butyl, t-amyl, α,α'-dimethylbenzyl and adamantyl.

When n is 1, examples of the organosilane compounds represented by the formula (c-i) include trialkoxysilanes, such as cyclopentyltrimethoxysilane, 2-methylcyclopentyltrimethoxysilane, 2,3-dimethylcyclopentyltrimethoxyslane, cyclopentyltriethoxysilane, iso-butyltriethoxysilane, t-butyltriethoxysilane, cyclohexyltrimethoxysilane, cyclohexyltriethoxysilane, 2-norbornanetrimethoxysilane and 2-norbornanetriethoxysilane.

When n is 2, examples of the organosilane compounds represented by the formula (c-i) include dialkoxysilanes, such as dicyclopentyldiethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane and 2-norbornanemethyldimethoxysilane.

When n is 2, the organosilane compound of the formula (c-i) is preferably a dimethoxysilane compound represented by the following formula (c-ii):

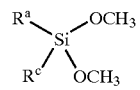

wherein $R^a$ and $R^c$ are each independently cyclopentyl, substituted cyclopentyl, cyclopentenyl, substituted cyclopentenyl, cyclopentadienyl, substituted cyclopentadienyl or a hydrocarbon group wherein the carbon adjacent to Si is secondary or tertiary carbon.

Examples of the organosilane compounds represented by the formula (c-ii) include:

dicyclopentyldimethoxysilane,
dicyclopentenyldimethoxysilane,
dicyclopentadienyldimethoxysilane,
di-t-butyldimethoxysilane,
di(2-methylcyclopentyl)dimethoxysilane,
di(3-methylcyclopentyl)dimethoxysilane,
di(2-ethylcyclopentyl)dimethoxysilane,
di(2,3-dimethylcyclopentyl)dimethoxysilane,
di(2,4-dimethylcyclopentyl)dimethoxysilane,
di(2,5-dimethylcyclopentyl)dimethoxysilane,
di(2,3-diethylcyclopentyl)dimethoxysilane,
di(2,3,4-trimethylcyclopentyl)dimethoxysilane,
di (2,3,5-triethylcyclopentyl)dimethoxysilane,
di(2,3,4-triethylcyclopentyl)dimethoxysilane,
di(tetramethylcyclopentyl)dimethoxysilane,
di(tetraethylcyclopentyl)dimethoxysilane,
di(2-methylcyclopentenyl)dimethoxysilane,
di(3-methylcyclopentenyl)dimethoxysilane,
di(2-ethylcyclopentenyl)dimethoxysilane,
di(2-n-butylcyclopentenyl)dimethoxysilane,
di(2,3-dimethylcyclopentenyl)dimethoxysilane,
di(2,4-dimethylcyclopentenyl)dimethoxysilane,
di(2,5-dimethylcyclopentenyl)dimethoxysilane,
di(2,3,4-trimethylcyclopentenyl)dimethoxysilane,
di(2,3,5-trimethylcyclopentenyl)dimethoxysilane,
di(2,3,4-triethylcyclopentenyl)dimethoxysilane,
di(tetramethylcyclopentenyl)dimethoxysilane,
di(tetraethylcyclopentenyl)dimethoxysilane,
di(2-methylcyclopentadienyl)dimethoxysilane,
di(3-methylcyclopentadienyl)dimethoxysilane,
di(2-ethylcyclopentadienyl)dimethoxysilane,
di(2-n-butylcyclopentadienyl)dimethoxysilane,
di(2,3-dimethylcyclopentadienyl)dimethoxysilane,
di(2,4-dimethylcyclopentadienyl)dimethoxysilane,
di(2,5-dimethylcyclopentadienyl)dimethoxysilane,
di(2,3-diethylcyclopentadienyl)dimethoxysilane,
di(2,3,4-trimethylcyclopentadienyl)dimethoxysilane,
di(2,3,5-trimethylcyclopentadienyl)dimethoxysilane,
di(2,3,4-triethylcyclopentadienyl)dimethoxysilane,
di(2,3,4,5-tetramethylcyclopentadienyl)dimethoxysilane,
di(2,3,4,5-tetraethylcyclopentadienyl)dimethoxysilane,
di(1,2,3,4,5-pentamethylcyclopentadienyl) dimethoxysilane, di(1,2,3,4,5-pentaethylcyclopentadienyl)dimethoxysilane,
di-t-amyldimethoxysilane,
di(α, α'-dimethylbenzyl)dimethoxysilane,
di(adamantyl)dimethoxysilane,
adamantyl-t-butyldimethoxysilane,
cyclopentyl-t-butyldimethoxysilane,
diisopropyldimethoxysilane,
di-s-butyldimethoxysilane,
di-s-amyldimethoxysilane, and
isopropyl-s-butyldimethoxysilane.

When n is 3, examples of the organosilane compounds represented by the formula (c-i) include monoalkoxysilanes, such as tricyclopentylmethoxysilane, tricyclopentylethoxysilane, dicyclopentylmethylmethoxysilane, dicyclopentylethylmethoxysilane, dicyclopentylmethylethoxysilane, cyclopentyldimethylmethoxysilane, cyclopentyldiethylmethoxysilane and cyclopentyldimethylethoxysilane.

Of the above compounds, preferred are ethyltriethoxysilane, n-propyltriethoxysilane, t-butyltriethoxysilane, vinyltriethoxysilane, phenyltriethoxysilane, vinyltributoxysilane, diphenyldimethoxysilane, phenylmethyldimethoxysilane, bis-p-tolyldimethoxysilane, p-tolylmethyldimethoxysilane, dicyclohexyldimethoxysilane, cyclohexylmethyldimethoxysilane, 2-norbornanetriethoxysilane, 2-norbornanemethyldimethoxysilane, phenyltriethoxysilane, hexenyltrimethoxysilane, cyclopentyltriethoxysilane, tricyclopentylmethoxysilane, cyclopentyldimethylmethoxysilane and dimethoxysilanes represented by the formula (c-ii). Particularly preferred are dimethoxysilanes represented by the formula (c-ii), specifically, dicyclopentyldimethoxysilane, di-t-butyldimethoxysilane, di(2-methylcyclopentyl)dimethoxysilane, di(3-methylcyclopentyl)dimethoxysilane and di-t-amyldimethoxysilane.

The organosilane compounds mentioned above may be used in combination of two or more kinds.

Olefin Polymerization Catalyst

The olefin polymerization catalyst according to the invention is formed from:
(A) the solid titanium catalyst component,
(B) the organoaluminum compound, and
(C) the organosilane compound having at least one alkoxy group.

In the preparation of the olefin polymerization catalyst, other components may optionally be used in addition to the above components (A), (B) and (C).

For example, there can be used:
the aforesaid polyethers;
2,6-substituted piperidines;
2,5-substituted piperidines;
substituted methylenediamines, such as N,N,N',N'-tetramethylmethylenediamine and N,N,N',N'-tetraethylmethylenediamine;
nitrogen-containing electron donors, such as 1,3-dibenzylimidazoline and 1,3-dibenzyl-2-phenylimidazoline;
phosphorus-containing electron donors, such as phosphites, e.g., triethyl phosphite, tri-n-propyl phosphite, triisopropyl phosphite, tri-n-butyl phosphite, triisobutyl phosphite, diethyl-n-butyl phosphite and diethylphenyl phosphite; and oxygen-containing electron donors, such as 2,6-substituted tetrahydropyrans and 2,5-substituted tetrahydropyrans.

These components may be used singly or in combination.

In the present invention, a prepolymerized catalyst may be formed from the above components.

The prepolymerized catalyst can be formed by pre(co)polymerizing olefins or the like in the presence of the solid titanium catalyst component (A), the organometallic compound (B), and optionally, the organosilane compound (C).

Examples of the olefins used in the prepolymerization include α-olefins of 2 or more carbon atoms, such as ethylene, propylene, 1-butene, 1-pentene, 1-hexene, 3-methyl-1-butene, 3-methyl-1-pentene, 3-ethyl-1-pentene, 4-methyl-1-pentene, 4,4-dimethyl-1-pentene, 4-methyl-1-hexene, 4,4-dimethyl-1-hexene, 4-ethyl-1-hexene, 3-ethyl-1-hexene, 1-octene, 1-decene, 1-dodecene, 1-tetradecene, 1-hexadecene, 1-octadecene and 1-eicosene. Also employable are other vinyl compounds and polyene compounds as described later. These monomers may be used singly or in combination.

The α-olefin used in the prepolymerization may be the same as or different from the later-described α-olefin used in the polymerization.

There is no specific limitation on the way to perform prepolymerization. For example, the prepolymerization can be carried out under the conditions where the olefins or the polyene compounds are liquid, or in the presence of an inert solvent or in a gas phase. Preferably, the prepolymerization is carried out in the presence of an inert solvent in such a way that the monomers are added to the inert solvent and the prepolymerization is performed under relatively mild conditions. In this case, the prepolymerization may be carried out under such conditions that the resulting prepolymer is dissolved or is not dissolved in a polymerization medium, but preferably the prepolymerization is carried out under such conditions that the prepolymer is not dissolved.

The prepolymerization is desirably performed at a temperature of usually about –20 to +100° C., preferably about –20 to +80° C., more preferably about –10 to +40° C.

The prepolymerization can be carried out by batchwise, semi-continuous by or continuous by.

The concentration of the catalyst in the prepolymerization system may be higher than that in the main polymerization system.

In the prepolymerization, the concentrations of the catalyst components vary depending on the types of the catalyst components used, but it is desired that the concentration of the solid titanium catalyst component (A) is in the range of usually about 0.001 to 5,000 mmol, preferably about 0.01 to 1,000 mmol, particularly preferably 0.1 to 500 mmol, in terms of titanium atom, based on 1 liter of the polymerization volume.

The organometallic compound (B) is used in such an amount that a pre(co)polymer is produced in an amount of 0.01 to 2,000 g, preferably 0.03 to 1,000 g, more preferably 0.05 to 200 g, based on 1 g of the solid titanium catalyst component (A), and is used in an amount of usually about 0.1 to 1,000 mol, preferably about 0.5 to 500 mol, particularly preferably 1 to 100 mol, based on 1 mol of the titanium atom in the solid titanium catalyst component (A).

In the prepolymerization, the organosilane compound (C) can optionally be used in an amount of usually 0.01 to 50 mol, preferably 0.05 to 30 mol, more preferably 0.1 to 10 mol, based on 1 mol of the titanium atom in the solid titanium catalyst component (A).

A molecular weight modifier such as hydrogen can be used in the prepolymerization.

When the prepolymerized catalyst is obtained in the form of a suspension as described above, it can be used as such in the subsequent polymerization, but it can also be used after separated from the suspension.

The prepolymerized catalyst generally forms an olefin polymerization catalyst together with the organometallic compound (B) and the organosilane compound (C), but in some cases only the prepolymerized catalyst can be used as the olefin polymerization catalyst. When the organosilane compound (C) is not used in the prepolymerization process, it can be added to the prepolymerized catalyst in the polymerization process to form an olefin polymerization catalyst.

The olefin polymerization catalyst of the invention may contain ingredients useful for the olefin polymerization other than those described above.

Olefin Polymerization Process

In the olefin polymerization process according to the invention, an olefin is polymerized or copolymerized in the presence of the olefin polymerization catalyst comprising the solid titanium catalyst component (A), the organometallic compound (B) and the organosilane compound (C), or comprising the prepolymerized catalyst.

Any of the α-olefins of 2 or more carbon atoms as described above for use in the prepolymerization is employable.

Also employable are:

cycloolefins, such as cyclopentene, cycloheptene, norbornene, 5-ethyl-2-norbornene, tetracyclododecene and 2-ethyl-1,4,5,8-dimethano-1,2,3,4,4a,5,8,8a-octahydronaphthalene; and vinyl compounds, such as styrene, dimethylstyrene, allylnaphthalene, allylnorbornane, vinylnaphthalene, allyltoluenes, allylbenzene, vinylcyclopentane, vinylcyclohexane, vinylcycloheptane and allyltrialkylsilanes.

Of these, preferred are ethylene, propylene, 1-butene, 3-methyl-1-butene, 3-methyl-1-pentene, 4-methyl-1-pentene, vinylcyclohexane, dimethylstyrene, allyltrimethylsilane and allylnaphthalene.

Further, small amounts of diene compounds may be copolymerized with the olefins.

Examples of the diene compounds include 1,3-butadiene, 1,3-pentadiene, 1,4-pentadiene, 1,3-hexadiene, 1,4-hexadiene, 1,5-hexadiene, 4-methyl-1,4-hexadiene, 5-methyl-1,4-hexadiene, 6-methyl-1,6-octadiene, 7-methyl-1,6-octadiene, 6-ethyl-1,6-octadiene, 6-propyl-1,6-octadiene, 6-butyl-1,6-octadiene, 6-methyl-1,6-nonadiene, 7-methyl-1,6-nonadiene, 6-ethyl-1,6-nonadiene, 7-ethyl-1,6-nonadiene, 6-methyl-1,6-decadiene, 7-methyl-1,6-decadiene, 6-methyl-1,6-undecadiene, 1,7-octadiene, 1,9-decadiene, isoprene, butadiene, ethylidenenorbornene, vinylnorbornene and dicyclopentadiene. These compounds may be used singly or in combination.

In the present invention, the polymerization can be carried out in a liquid phase including solution and suspension, or in a gas phase.

When the polymerization is carried out in a slurry, the above-mentioned inert organic solvent, or an olefin which is liquid at the reaction temperature can be used.

In the polymerization, the solid titanium catalyst component (A) or the prepolymerized catalyst is used in an amount of usually about 0.001 to 100 mmol, preferably about 0.005 to 20 mmol, in terms of the titanium atom, based on 1 liter of the polymerization volume.

The organometallic compound (B) is used in an amount of usually about 1 to 2,000 mol, preferably about 2 to 500 mol, in terms of the metallic atom in the compound (B), based on 1 mol of the titanium atom in the polymerization system.

The organosilane compound (C) is used in an amount of usually about 0.001 to 10 mol, preferably 0.01 to 5 mol, based on 1 mol of the metallic atom in the organometallic compound (B).

If the prepolymerized catalyst is used in the polymerization process, addition of the organometallic compound (B) and the organosilane compound (C) may be omitted according to circumstances. When the olefin polymerization catalyst is formed from the prepolymerized catalyst and the component (B) and/or the component (C), the components (B) and (C) may be used in the above-mentioned amounts.

If hydrogen is used in the polymerization, a molecular weight of the resulting polymer can be modified, and therefore a polymer having a high melt flow rate can be obtained.

In the olefin polymerization process according to the invention, the polymerization temperature is in the range of usually about 20 to 300° C., preferably about 50 to 150° C., and the polymerization pressure is in the range of atmospheric pressure to 100 kg/cm$^2$, preferably about 2 to 50 kg/cm$^2$, though they vary depending on the type of olefin, the mode of polymerization, etc.

In the process of the invention, the polymerization can be carried out batchwise, semi-continuously or continuously, or in two or more stages under different reaction conditions.

In the present invention, not only a homopolymer of an olefin but also a random copolymer or a block copolymer from two or more types of olefin may be prepared. The polymerization process of the invention is particularly suited for the preparation of a highly stereoregular homopolymer of propylene, and a random copolymer of propylene and ethylene and/or an olefin of 4 to 20 carbon atoms, in which a content of decane-solubles is decreased. Amounts of the comonomers to be reacted with propylene are 0 to 500 g, preferably 0.5 to 100 g, more preferably 5 to 10 g for ethylene, and 0 to 2,000 g, preferably 10 to 1,000 g, more preferably 50 to 500 g for the olefin of at least 4 carbon atoms. The resulting copolymer contains propylene unites in an amount of at least 58 mol %, preferably at least 90 mol %, more preferably at least 93 mol %, both based on 1 kg of propylene.

The ethylene content and the $C_4$-$C_{20}$ α-olefin content in the copolymer of propylene and ethylene and/or $C_4$-C20 α-olefin can be measured by the methods described below.

The term "ethylene" of the ethylene content means isolated ethylene. The term "isolated ethylene" means ethylene units in the polymer chain wherein 3 or more ethylene units are continuously polymerized. The isolated ethylene content ($C^2$) can be measured in the following manner. In an hydroforming machine (manufactured by Toho Press Seisakusho), 0.5 g of a sample is heated for 2 minutes and a half, degassed at 20 atm and then pressed for 10 seconds at 80 atom. Subsequently, the resulting product is pressed at 100 atom for 1 minute by means of a hydroforming machine in which a cooling water is circulated, to obtain a film. In this operation, an iron spacer is used to adjust the thickness of the resulting film to about 0.3 mm. An absorption spectrum of infrared rays within the region of 800 to 650 cm$^{-1}$ is measured for the film obtained by means of a diffraction grating infrared spectrophotometer (DS-701G type, manufactured by Nippon Bunko K. K.) to obtain the transmittances. In the resulting chart, a tangent line common to the maximum point in the vicinity of 760 cm$^{-1}$ and the maximum point in the vicinity of 700 cm$^{-1}$ is drawn, and this tangent line is taken as a base line. A transmittance (T %) of the absorption minimum point at 733 cm$^{-1}$ and a transmittance ($T_0$%) of an intersection point of the base line and a perpendicular from the absorption minimum point at 733 cm$^{-1}$ to the wave number line are read out. Using the results, an absorbance at 733 cm$^{-1}$ ($D_{733}$ =log($T_0$/T) is calculated. Then, the isolated ethylene content ($C^2$) is determined from the following equation:

Isolated ethylene content (%)=6.17×($D_{733}$/L)

wherein $D_{733}$ is the absorbance at 733 cm$^{-1}$ and L (mm) is the thickness of the film used for the measurement.

The 1-butene content ($C^4$) representing the $C_4$–$C_{20}$ α-olefin content can be measured in the following manner. A film was prepared from 0.5 g of a sample in the same manner as described above. In this operation, an iron spacer is used to adjust the thickness of the resulting film to about 0.3 mm. An absorption spectrum of infrared rays within the region of 800 to 700 cm$^{-1}$, is measured for the film obtained by means of a diffraction grating infrared spectrophotometer (DS-701G type, manufactured by Nippon Bunko K. K.) to obtain the transmittances. In the resulting chart, a tangent line common to the maximum point in the vicinity of 775 cm$^{-1}$ and the maximum point in the vicinity of 750 cm$^{-1}$ is drawn, and this tangent line is taken as a base line. A transmittance (T %) of the absorption minimum point at 765 cm$^{-1}$ and a transmittance ($T_0$%) of an intersection point of the base line and a perpendicular from the absorption minimum point at 765 cm$^{-1}$ to the wave number line are read out. Using the results, an absorbance at 765 cm$^{-1}$ ($D_{765}$=log($T_0$/T) is calculated. Then, the 1-butene content ($C^4$) is determined from the following equation:

1-Butene content (%)=7.77×($D_{765}$/L)

wherein $D_{765}$ is the absorbahce at 765 cm$^{-1}$ and L(mm) is the thickness of the film used for the measurement.

EFFECT OF THE INVENTION

By the use of the olefin polymerization catalyst containing the solid titanium catalyst component of the invention, the quantity of a polyolefin of low stereoregularity produced as a by-product can be decreased, and a polyolefin of high stereoregularity can be prepared with prominently high polymerization activities.

EXAMPLE

The present invention will be further described with reference to the following examples, but it should be construed that the invention is in no way limited to those examples.

EXAMPLE 1

Preparation of solid titanium catalyst component (A-1)

Preparation of solid titanium (i)

7.14 g (75 mmol) of anhydrous magnesium chloride, 37.5 ml of decane and 35.1 ml (225 mmol) of 2-ethylhexyl alcohol were mixed, and the mixture was heated at 130° C. for 2 hours to give a homogeneous solution. To the solution was added 1.67 g (11.5 mmol) of phthalic anhydride, and the mixture was stirred at 130° C for another 1 hour to dissolve the phthalic anhydride in the solution.

The resulting homogeneous solution was cooled to room temperature, and then the whole amount of the solution was dropwise added to 200 ml (1.8 mol) of titanium tetrachloride (TiCl$_4$) maintained at −20° C., over a period of 1 hour. After the dropwise addition, the temperature of the resulting solution was elevated to 110° C. over a period of 4 hours. When the temperature reached 110° C., 5.03 ml (18.8 mmol) of diisobutyl phthalate was added to the solution, followed by stirring at the same temperature for 2 hours.

After completion of the 2-hour reaction, a solid (1) produced was recovered by hot filtration, resuspended in 275 ml of TiCl$_4$ and then heated again at 110° C. for 2 hours.

After completion of the reaction, a solid (2) produced was recovered by hot filtration, and then washed with toluene at 100° C. and then hexane. A suspension of the solid (2) in 100 ml of hexane was stirred with a spatula for about 30 seconds and filtered. This step was repeated until no titanium compound was detected in the filtrate.

Thus, a solid titanium (i) was obtained as a hexane slurry. A part of the solid titanium (i) was withdrawn and dried to analyze its composition.

In the solid titanium (i), 2.4% by weight of titanium, 60% by weight of chlorine, 20% by weight of magnesium and 13% by weight of diisobutyl phthalate were contained.

Contact with o-dichlorobenzene

To a 200 ml glass reactor thoroughly purged with nitrogen were introduced 100 ml of o-dichlorobenzene and then 1.0 mmol (in terms of titanium atom) of the solid titanium (i).

The internal temperature of the reactor was maintained at 70° C., and the mixture was stirred at 400 rpm for 1 hour using a stirring blade.

After heating and stirring, a solid produced was recovered by filtration, and washed three times with hexane to obtain a solid titanium catalyst component (A-1).

A part of the solid titanium catalyst component (A-1) was withdrawn and dried to analyze its composition.

In the solid titanium catalyst component (A-1), 1.3% by weight of titanium, 60.0% by weight of chlorine, 20.0% by weight of magnesium and 11.3% by weight of diisobutyl phthalate were contained. Therefore, the weight ratio of the electron donor to titanium was 8.69, and the titanium content was decreased by 45.8% by weight as compared with the solid titanium (i) before the contact with o-dichlorobenzene.

Washing of solid titanium catalyst component (A-1) with o-dichlorobenzene at 90° C.

0.5 g of the solid titanium catalyst component (A-1) was introduced into a 200 ml glass reactor thoroughly purged with nitrogen. To the reactor was added 100 ml of o-dichlorobenzene. The internal temperature of the reactor was maintained at 90° C., and the mixture was stirred at 400 rpm for 1 hour using stirring blade. After completion of the stirring, a solid produced was recovered by filtration, washed twice with hexane and vacuum dried.

The titanium content in the solid titanium catalyst component (A-1) after washing was 1.2% by weight. Therefore, the decrease ratio of the titanium content by washing with o-dichlorobenzene at 90° C. was 7.7% by weight.

Preparation of prepolymerized catalyst (I-1)

To a 200 ml glass reactor thoroughly purged with nitrogen was introduced 100 ml of purified hexane and were further introduced 2 mmol of triethylaluminum, 0.4 mmol of dicyclopentyldimethoxysilane and 0.2 mmol (in terms of titanium atom) of the solid titanium catalyst component (A-1). Then, propylene was fed at a rate of 1.0 liter/hr for 1 hour.

After feeding of propylene, a solid produced was recovered by filtration, washed twice with hexane and resuspended in decane. The whole amount of the suspension was transferred into a catalyst bottle to obtain a prepolymerized catalyst (I-1).

Polymerization

To a 1 liter autoclave was introduced 400 ml of purified heptane and were further introduced 0.4 mmol of triethylaluminum, 0.4 mmol of dicyclopentyldimethoxysilane and 0.008 mmol (in terms of titanium atom) of the prepolymerized catalyst (I-1) in a propylene atmosphere at 60° C. Then, 100 ml of hydrogen was added, and the system was heated to 70° C. and maintained at the same temperature for 1 hour to perform polymerization of propylene. During the polymerization, the pressure was kept at 5 kg/m$^2$-G. After completion of the polymerization, the slurry containing a polymer produced was filtered to separate a white granular polymer from a liquid phase. The results are set forth in Table 1.

EXAMPLE 2

Preparation of solid titanium catalyst component (A-2)

Contact with o-dichlorobenzene

To a 200 ml glass reactor thoroughly purged with nitrogen were introduced 100 ml of o-dichlorobenzene and then 1.0 mmol (in terms of titanium atom) of the solid titanium (i) obtained in Example 1.

The internal temperature of the reactor was maintained at 100° C., and the mixture was stirred at 400 rpm for 1 hour using a stirring blade.

After heating and stirring, a solid produced was recovered by filtration and washed three times with hexane to obtain a solid titanium catalyst component (A-2).

A part of the solid titanium catalyst component (A-2) was withdrawn and dried to analyze its composition.

In the solid titanium catalyst component (A-2), 1.1% by weight of titanium, 60.0% by weight of chlorine, 20.5% by weight of magnesium and 11.4% by weight of diisobutyl phthalate were contained. Therefore, the weight ratio of the electron donor to titanium was 10.36, and the titanium content was decreased by 54.2% by weight as compared with the titanium-containing solid (i) before the contact with o-dichlorobenzene.

Washing of solid titanium catalyst component (A-2) with o-dichlorobenzene at 90° C.

Washing with o-dichlorobenzene at 90° C. was carried out in the same manner as in Example 1 except that the solid titanium catalyst component (A-2) was used in place of the solid titanium catalyst component (A-1).

The titanium content in the solid titanium catalyst component (A-2) after washing was 1.1% by weight. Therefore, the decrease ratio of the titanium content by washing with o-dichlorobenzene at 90° C. was 0% by weight.

Preparation of prepolymerized catalyst (I-2)

A prepolymerized catalyst (I-2) was obtained in the same manner as in Example 1 except that 0.2 mmol (in terms of titanium atom) of the solid titanium catalyst component (A-2) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-2) was used in place of the prepolymerized catalyst (I-1). The results are set forth in Table 1.

EXAMPLE 3

Preparation of solid titanium catalyst component (A-3)

Contact with α,α,α-trichlorotoluene

A solid titanium catalyst component (A-3) was obtained in the same manner as in Example 2 except that 100 ml of α,α,α-trichlorotoluene was used in place of o-dichlorobenzene.

In the solid titanium catalyst component (A-3), 1.0% by weight of titanium, 60.0% by weight of chlorine, 20.0% by weight of magnesium and 11.3% by weight of diisobutyl phthalate were contained. Therefore, the weight ratio of the electron donor to titanium was 11.3, and the titanium content was decreased by 58.3% by weight as compared with the titanium-containing solid (i) before the contact with α,α,α-trichlorotoluene.

Washing of solid titanium catalyst component (A-3) with o-dichlorobenzene at 90° C.

Washing with o-dichlorobenzene at 90° C. was carried out in the same manner as in Example 1 except that the solid titanium catalyst component (A-3) was used in place of the solid titanium catalyst component (A-1).

The titanium content in the solid titanium catalyst component (A-3) after washing was 1.0% by weight. Therefore, the decrease ratio of the titanium content by washing with o-dichlorobenzene at 90° C. was 0% by weight.

Preparation of prepolymerized catalyst (I-3)

A prepolymerized catalyst (I-3) was obtained in the same manner as in Example 1 except that 0.2 mmol (in terms of titanium atom) of the solid titanium catalyst component (A-3) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-3) was used in place of the prepolymerized catalyst (I-1). The results are set forth in Table 1.

Comparative Example 1

Preparation of solid titanium catalyst component (A-4)

A solid titanium catalyst component (A-4) was obtained in the same manner as in Example 1 except that the solid titanium (i) was contacted with 100 ml of toluene in place of o-dichlorobenzene.

In the solid titanium catalyst component (A-4), 1.5% by weight of titanium, 60.5% by weight of chlorine, 20.0% by weight of magnesium and 8.7% by weight of diisobutyl phthalate were contained. Therefore, the weight ratio of the electron donor to titanium was 5.8, and the titanium content was decreased by 37.5% by weight as compared with the titanium-containing solid (i) before the contact with toluene.

Washing of solid titanium catalyst component (A-4) with o-dichlorobenzene at 90° C.

Washing with o-dichlorobenzene at 90° C. was carried out in the same manner as in Example 1 except that the solid titanium catalyst component (A-4) was used in place of the solid titanium catalyst component (A-1).

The titanium content in the solid titanium catalyst component (A-4) after washing was 1.2% by weight. Therefore, the decrease ratio of the titanium content by washing with o-dichlorobenzene at 90° C. was 20% by weight.

Preparation of Prepolymerized catalyst (I-4)

A prepolymerized catalyst (I-4) was obtained in the same manner as in Example 1 except that 0.2 mmol (in terms of titanium atom) of the solid titanium catalyst component (A-4) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-4) was used in place of the prepolymerized catalyst (I-1). The results are set forth in Table 1.

Comparative Example 2

Preparation of solid titanium catalyst component (A-5)

A solid titanium catalyst component (A-5) was obtained in the same manner as in Example 1 except that the solid titanium (i) was contacted at 40° C. with 100ml of tert-butyl chloride in place of o-dichlorobenzene.

In the solid titanium catalyst component (A-5), 1.6% by weight of titanium, 60.0% by weight of chlorine, 20.0% by weight of magnesium and 9.5% by weight of diisobutyl phthalate were contained. Therefore, the weight ratio of the electron donor to titanium was 5.93, and the titanium content was decreased by 33.3% by weight as compared with the titanium-containing solid (i) before the contact with tert-butyl chloride.

Washing of solid titanium catalyst component (A-5) with o-dichlorobenzene at 90° C.

Washing with o-dichlorobenzene at 90° C. was carried out in the same manner as in Example 1 except that the solid titanium catalyst component (A-5) was used in place of the solid titanium catalyst component (A-1).

The titanium content in the solid titanium catalyst component (A-5) after washing was 1.2% by weight. Therefore, the decrease ratio of the titanium content by washing with o-dichlorobenzene at 90° C. was 25% by weight.

Preparation of prepolymerized catalyst (I-5)

A prepolymerized catalyst (I-5) was obtained in the same manner as in Example 1 except that 0.2 mmol (in terms of titanium atom) of the solid titanium catalyst component (A-5) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-5) was used in place of the prepolymerized catalyst (I-1). The results are set forth in Table 1.

Comparative Example 3

Washing of solid titanium (i) with o-dichlorobenzene at 90° C.

Washing with o-dichlorobenzene at 90° C. was carried out in the same manner as in Example 1 except that the solid titanium (i) obtained in Example 1 was used in place of the solid titanium catalyst component (A-1).

The titanium content in the solid titanium (i) after washing was 1.2% by weight. Therefore, the decrease ratio of the titanium content by washing with o-dichlorobenzene at 90° C. was 50% by weight. In the solid titanium (i), the weight ratio of the electron donor to titanium was 5.42.

Preparation of prepolymerized catalyst (I-6)

A prepolymerized catalyst (I-6) was obtained in the same manner as in Example 1 except that 0.2 mmol (in terms of titanium atom) of the solid titanium (i) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-6) was used in place of the prepolymerized catalyst (I-1). The results are set forth in Table 1.

The melting point (Tm) of the polymer was measured in accordance with ASTM-1 using DSC-7 of Perkin-Elmer Co. in the following manner. A sample was heated from room temperature to 200° C. at a rate of 320° C./min, maintained at 200° C. for 10 minutes and then cooled to 30° C. at a rate of 10 C./min. An exotherm curve given by crystallization of the polymer in the cooling operation was processed according to the analytical program of DSC-7 to determine a temperature at the exothermic peak, which is referred to as "Tc". Subsequently, the sample was maintained at 30° C. for 5 minutes and then heated to 200° C. at a rate of 10° C./min. An endotherm curve given by melting of the polymer in the heating operation was processed according to the analytical program of DSC-7 to determine a temperature at the endothermic peak, which was regarded as a melting point "Tm".

The content of n-decane-solubles in the polymer was measured in the following manner. Into a 1 liter flask were introduced 3 g of a sample, 20 mg of 2,6-di-tert-butyl-4-methylphenol and 500 ml of n-decane, and the mixture was heated at 145° C. to give a solution which was then cooled to 23° C. over a period of 8 hours and maintained at 23° C. for 8 hours. A solid precipitated was separated from the n-decane solution containing a polymer dissolved by filtration through a glass filter. The liquid phase was dried at 150° C. under reduced pressure until a constant weight was reached, and the weight is measured. The decane-soluble content is determined as percentage of the weight of the polymer dissolved to the weight of the sample.

The molecular weight (Mw) and the molecular weight distribution (Mw/Mn) of polymers were measured by gel permeation chromatography using a TSK mixed polystyrene gel column (G3000–G7000) eluted with o-dichlorobenzene at 140° C.

The bulk specific gravity of polymers was measured in accodance with JIS K-6721.

TABLE 1

| | Yield of polymer (g) | | | Amount of decane-soluble component (wt %) | |
|---|---|---|---|---|---|
| | Granular polymer | Solvent-soluble portion | Activity (g-PP/mmol-Ti) | in granular polymer | in the whole polymer |
| Ex. 1 | 150.8 | 0.2 | 18,900 | 0.23 | 0.36 |
| Ex. 2 | 145.4 | 0.1 | 18,200 | 0.18 | 0.24 |
| Ex. 3 | 186.6 | 0.2 | 23,400 | 0.18 | 0.29 |
| Comp. Ex. 1 | 112.2 | 0.1 | 14,000 | 0.50 | 0.59 |
| Comp. Ex. 2 | 86.7 | 0.1 | 10,900 | 0.67 | 0.78 |
| Comp. Ex. 3 | 119.8 | 0.1 | 15,000 | 0.55 | 0.63 |

| | Tm (° C.) | Bulk specific gravity (g/ml) | Mw | Mw/Mn |
|---|---|---|---|---|
| Ex. 1 | 163.9 | 0.42 | 492,000 | 5.03 |
| Ex. 2 | 164.5 | 0.44 | 493,000 | 4.81 |
| Ex. 3 | 164.4 | 0.42 | 473,000 | 5.45 |
| Comp. Ex. 1 | 163.8 | 0.42 | 481,000 | 5.84 |
| Comp. Ex. 2 | 163.6 | 0.41 | 475,000 | 5.43 |
| Comp. Ex. 3 | 163.8 | 0.43 | 486,000 | 5.65 |

EXAMPLE 4

Preparation of solid titanium catalyst component (A-6)

A solid titanium catalyst component (A-6) was obtained in the same manner as in Example 1 except that the temperature for contacting the solid titanium (i) with o-dichlorobenzene was varied to 130° C. from 70° C.

In the solid titanium catalyst component (A-6), 0.9% by weight of titanium, 61% by weight of chlorine, 20.5% by weight of magnesium and 8.7% by weight of diisobutyl phthalate were contained. Therefore, the weight ratio of the electron donor to titanium was 9.67, and the titanium content was decreased by 62.5% by weight as compared with the titanium-containing solid (i) before the contact with o-dichlorobenzene.

Washing of solid titanium catalyst component (A-6) with o-dichlorobenzene at 90° C.

Washing with o-dichlorobenzene at 90° C. was carried out in the same manner as in Example 1 except that the solid titanium catalyst component (A-6) was used in place of the solid titanium catalyst component (A-1).

The titanium content in the solid titanium catalyst component (A-6) after washing was 0.9% by weight. Therefore, the decrease ratio of the titanium content by washing with o-dichlorobenzene at 90° C. was 0% by weight.

Preparation of prepolymerized catalyst (I-7)

A prepolymerized catalyst (I-7) was obtained in the same manner as in Example 1 except that 0.2 mmol (in terms of titanium atom) of the solid titanium catalyst component (A-6) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-7) was used in place of the prepolymerized catalyst (I-1). The yield of the (granular) polymer was 90.0 g and the amount of the solvent-soluble component was 0.0 g. Therefore, the polymerization activity was 2,200 g-PP/g-cat. The amount of the decane-soluble component in the granular polymer, i.e., the whole polymer, was 0.12% by weight.

The polymer had a melting point (Tm) of 164.5° C., a bulk specific gravity of 0.41 g/ml, Mw of 438,000 and Mw/Mn of 3.79.

EXAMPLE 5

Preparation of solid titanium catalyst component (A-7)

Preparation of solid titanium (i)-2

7.14 g (75 mmol) of anhydrous magnesium chloride, 37.5 ml of decane and 35.1 ml (225 mmol) of 2-ethylhexyl alcohol were mixed, and the mixture was heated at 130° C. for 2 hours to give a homogeneous solution. To the solution was added 1.67 g (11.5 mmol) of phthalic anhydride, and the mixture was stirred at 130° C. for 1 hour to dissolve the phthalic anhydride in the solution.

After the resulting homogeneous solution was cooled to room temperature, the whole amount of the solution was dropwise added to 200 ml (1.8 mol) of titanium tetrachloride ($TiCl_4$) maintained at −20° C., over a period of 1 hour. After the dropwise addition, the temperature of the resulting solution was elevated to 110° C. over a period of 4 hours. When the temperature reached 110° C., to the solution was added 5.03 ml (18.8 mmol) of diisobutyl phthalate, followed by stirring at the same temperature for 2 hours.

After completion of the 2-hour reaction, a solid (1) (solid titanium (i)-2) produced was recovered by hot filtration, and washed with decane of 110° C. and then hexane of room temperature. A suspension of the solid (1) in 100 ml of hexane was stirred with a spatula for about 30 seconds and filtered. This step was repeated until no titanium compound was detected in the filtrate.

In the solid titanium (i)-2 thus obtained, 3.9% by weight of titanium, 52.0% by weight of chlorine, 17.5% by weight of magnesium and 17.2% by weight of diisobutyl phthalate were contained.

Contact with 1,2,4-trichlorobenzene

The solid titanium (i)-2 obtained above was resuspended in 375 ml of 1,2,4-trichlorobenzene and then heated at 130° C. for 1 hour.

After completion of the reaction, a solid produced was recovered by hot filtration and washed with decane of 110° C. and then hexane. A suspension of the solid in 100 ml of hexane was stirred with a spatula for about 30 second and filtered. This step was repeated until no titanium compound was detected in the filtrate.

Thus, a solid titanium catalyst component (A-7) was obtained in the form of a hexane slurry. A part of the solid titanium catalyst component (A-7) was withdrawn and dried to analyze its composition.

In the solid titanium catalyst component (A-7), 1.4% by weight of titanium, 60% by weight of chlorine, 20% by weight of magnesium and 13.6% by weight of diisobutyl phthalate were contained. Therefore, the weight ratio of the electron donor to titanium was 9.71, and the titanium content was decreased by 64.1% by weight as compared with the solid titanium (i)-2 before the contact with 1,2,4-trichlorobenzene.

Washing of solid titanium catalyst component (A-7) with o-dichlorobenzene at 90° C.

0.5 g of the solid titanium catalyst component (A-7) was introduced into a 200 ml glass reactor thoroughly purged with nitrogen. Then, to the reactor was added 100 ml of o-dichlorobenzene. The internal temperature of the reactor was maintained at 90° C., and the mixture was stirred at 400 rpm for 1 hour using stirring blade. After the stirring, a solid produced was recovered by filtration, washed twice with hexane and vacuum dried.

The titanium content in the solid titanium catalyst component (A-7) after washing was 1.4% by weight. Therefore, the decrease ratio of the titanium content by washing with o-dichlorobenzene at 90° C. was 0% by weight.

Preparation of prepolymerized catalyst (I-8)

A prepolymerized catalyst (I-8) was obtained in the same manner as in Example 1 except that the solid titanium catalyst component (A-7) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-8) was used in place of the prepolymerized catalyst (I-1). The results are set forth in Table 2.

EXAMPLE 6

Preparation of solid titanium catalyst component (A-8)

A solid titanium catalyst component (A-8) was obtained in the same manner as in Example 5 except that 11.5 mmol of 2-n-butoxyethanol was used in place of 11.5 mmol of phthalic anhydride in the preparation of the solid titanium (i)-2.

In the solid titanium catalyst component (A-8) obtained by the contact with 1,2,4-trichlorobenzene, 1.0% by weight of titanium, 56% by weight of chlorine, 18% by weight of magnesium and 19.5% by weight of diisobutyl phthalate were contained. Therefore, the weight ratio of the electron donor to titanium was 19.5, and the titanium content was decreased by 83.3% by weight as compared with that before the contact with 1,2,4-trichlorobenzene.

Washing of solid titanium catalyst component (A-8) with o-dichlorobenzene at 90° C.

Washing with o-dichlorobenzene at 90° C. was carried out in the same manner as in Example 1 except that the solid titanium catalyst component (A-8) was used in place of the solid titanium catalyst component (A-1).

The titanium content in the solid titanium catalyst component (A-8) after washing was 1.0% by weight. Therefore, the decrease ratio of the titanium content by washing with o-dichlorobenzene at 90° C. was 0% by weight.

Preparation of prepolymerized catalyst (I-9)

A prepolymerized catalyst (I-9) was obtained in the same manner as in Example 1 except that 0.2 mmol (in terms of titanium atom) of the solid titanium catalyst component (A-8) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-9) was used in place of the prepolymerized catalyst (I-1). The results are set forth in Table 2.

EXAMPLE 7

Preparation of solid titanium catalyst component (A-9)

A solid titanium catalyst component (A-9) was obtained in the same manner as in Example 5 except that 0.06 g of $TiO_2$ was suspended in $TiCl_4$ maintained at −20° C. in the preparation of the solid titanium (i)-2.

In the solid titanium catalyst component (A-9) obtained by the contact with 1,2,4-trichlorobenzene, 2.1% by weight of titanium, 56% by weight of chlorine, 19% by weight of magnesium and 18.0% by weight of diisobutyl phthalate were contained. Therefore, the weight ratio of the electron donor to titanium was 8.6, and the titanium content was decreased by 53% by weight as compared with that before the contact with 1,2,4-trichlorobenzene.

Washing of solid titanium catalyst component (A-9) with o-dichlorobenzene at 90° C.

Washing with o-dichlorobenzene at 90° C. was carried out in the same manner as in Example 1 except that the solid titanium catalyst component (A-9) was used in place of the solid titanium catalyst component (A-1).

The titanium content in the solid titanium catalyst component (A-9) after washing was 2.1% by weight. Therefore, the decrease ratio of the titanium content by washing with o-dichlorobenzene at 90° C. was 0% by weight.

Preparation of prepolymerized catalyst (I-10)

A prepolymerized catalyst (I-10) was obtained in the same manner as in Example 1 except that 0.2 mmol (in terms of titanium atom) of the solid titanium catalyst component (A-9) was used in place of the solid titanium catalyst component (A-1).

Polymerization

Polymerization of propylene was carried out in the same manner as in Example 1 except that 0.008 mmol (in terms of titanium atom) of the prepolymerized catalyst (I-10) was used in place of the prepolymerized catalyst (I-1). The results are set forth in Table 2.

TABLE 2

| | Yield of polymer (g) | | | Amount of decane-soluble component (wt %) | |
|---|---|---|---|---|---|
| | Granular polymer | Solvent-soluble portion | Activity (g-PP/g-cat) | in granular polymer | in the whole polymer |
| Ex. 5 | 174.0 | 0.0 | 3,600 | 0.12 | 0.12 |
| Ex. 6 | 112.8 | 0.0 | 3,600 | 0.05 | 0.05 |
| Ex. 7 | 99.3 | 0.1 | 4,400 | 0.15 | 0.25 |

| | Tm (° C.) | Bulk specific gravity (g/ml) | Mw | Mw/Mn |
|---|---|---|---|---|
| Ex. 5 | 164.9 | 0.37 | 442,000 | 3.87 |
| Ex. 6 | 164.5 | 0.36 | 459,000 | 4.04 |
| Ex. 7 | 165.0 | 0.37 | 475,000 | 4.63 |

EXAMPLE 8

Polymerization

To a 2-liter autoclave were introduced 400 g of propylene, 3.0 liters of ethylene and 4.5 liters of hydrogen, and the temperature was elevated to 60° C. To the autoclave were then introduced 0.6 mmol of triethylaluminum, 0.6 mmol of dicyclopentyldimethoxysilane and 0.003 mmol (in terms of titanium atom) of the prepolymerized catalyst (I-7) obtained in Example 4, and the system was maintained at 70° C. for 30 minutes to perform copolymerization of propylene and ethylene. The results are set forth in Table 3.

EXAMPLE 9

Polymerization

Copolymerization of propylene and ethylene was carried out in the same manner as in Example 8 except that the amount of ethylene was varied to 4.0 liters. The results are set forth in Table 3.

EXAMPLE 10

Polymerization

Copolymerization of propylene and ethylene was carried out in the same manner as in Example 8 except that the amounts of ethylene, triethylaluminum and dicyclopentyldimethoxysilane were varied to 2.5 liters, 0.8 mmol and 0.8 mmol, respectively, and 0.004 mmol (in terms of titanium atom) of the prepolymerized catalyst (I-8) obtained in Example 5 was used in place of the prepolymerized catalyst (I-7). The results are set forth in Table 3.

EXAMPLE 11

Polymerization

Copolymerization of propylene and ethylene was carried out in the same manner as in Example 10 except that the amount of ethylene was varied to 3.0 liters. The results are set forth in Table 3.

TABLE 3

| | Yield of polymer (g) | Activity (g-PP/g-cat) | Decane-soluble component (wt %) |
|---|---|---|---|
| Ex. 8 | 120.3 | 7,100 | 4.0 |
| Ex. 9 | 120.8 | 7,100 | 7.7 |
| Ex. 10 | 112.8 | 7,700 | 2.7 |
| Ex. 11 | 98.7 | 6,500 | 4.7 |

| | Ethylene content (mol %) | Tm (° C.) | Bulk specific gravity (g/ml) |
|---|---|---|---|
| Ex. 8 | 3.9 | 141.8 | 0.40 |
| Ex. 9 | 4.8 | 137.4 | 0.38 |
| Ex. 10 | 3.6 | 142.2 | 0.34 |
| Ex. 11 | 4.5 | 137.4 | 0.29 |

EXAMPLE 12

Preparation of solid titanium catalyst component (A-10)

Preparation of solid titanium (i)

7.14 g (75 mmol) of anhydrous magnesium chloride, 37.5 ml of decane and 35.1 ml (225 mmol) of 2-ethylhexyl alcohol were mixed, and the mixture was heated at 130° C. for 2 hours to give a homogeneous solution. To the solution was added 1.67 g (11.5 mmol) of phthalic anhydride, and the mixture was stirred at 130° C. for another 1 hour to dissolve the phthalic anhydride in the solution.

The resulting homogeneous solution was cooled to room temperature, and then the whole amount of the solution was dropwise added to 200 ml (1.8 mol) of titanium tetrachloride ($TiCl_4$) maintained at −20° C., over a period of 1 hour. After the dropwise addition, the temperature of the resulting solution was elevated to 110° C. over a period of 4 hours. When the temperature reached 110° C., 5.03 ml (18.8 mmol) of diisobutyl phthalate was added to the solution, followed by stirring at the same temperature for 2 hours.

After completion of the 2-hour reaction, a solid (1) produced was recovered by hot filtration, resuspended in 275 ml of TiCl4 and then heated again at 110° C. for 2 hours.

After completion of the reaction, a solid (2) produced was recovered by hot filtration, and washed with toluene at 100° C. and then hexane. A suspension of the solid (2) in 100 ml of hexane was stirred with a spatula for about 30 second and filtered. This step was repeated until no titanium compound was detected in the filtrate.

Thus, a solid titanium (i) was obtained as a hexane slurry. A part of the solid titanium (i) was withdrawn and dried to analyze its composition.

In the solid titanium (i), 2.5% by weight of titanium, 60% by weight of chlorine, 20% by weight of magnesium and 13% by weight of diisobutyl phthalate were contained.

Contact with polar compound

To a 200 ml glass reactor thoroughly purged with nitrogen were introduced 100 ml of o-dichlorobenzene and then 1.0 mmol (in terms of titanium atom) of the solid titanium (i).

The internal temperature of the reactor was maintained at 100° C., and the mixture was stirred at 400 rpm for 1 hour using a stirring blade.

After heating and stirring, a solid produced was recovered by filtration, and washed three times with hexane to obtain a solid titanium catalyst component (A-10).

A part of the solid titanium catalyst component (A-10) was withdrawn and dried to analyze its composition.

In the solid titanium catalyst component (A-10), 0.95% by weight of titanium, 60.0% by weight of chlorine, 20.5% by weight of magnesium and 11.4% by weight of diisobutyl phthalate were contained.

Preparation of prepolymerized catalyst (I-11)

To a 200 ml glass reactor thoroughly purged with nitrogen was introduced 100 ml of purified hexane and were further introduced 2 mmol of triethylaluminum, 0.4 mmol of dicyclopentyldimethoxysilane and 0.2 mmol (in terms of titanium atom) of the solid titanium catalyst component (A-10). Then, propylene was fed at a rate of 1.0 liter/hr for 1 hour.

After feeding of propylene, a solid produced was recovered by filtration, washed twice with purified hexane and resuspended in decane. The whole amount of the suspension was transferred into a catalyst bottle to obtain a prepolymerized catalyst (I-11).

Polymerization

To a 1 liter autoclave was introduced 400 ml of purified heptane and were further introduced 0.4 mmol of triethylaluminum, 0.4 mmol of dicyclopentyldimethoxysilane and 0.008 mmol (in terms of titanium atom) of the prepolymerized catalyst (I-11) in a propylene atmosphere at 60° C. Then, 100 ml of hydrogen was added, and the system was heated to 70° C. and maintained at the same temperature for 1 hour to perform polymerization of propylene. During the polymerization, the pressure was kept at 5 kg/m$^2$-G. After completion of the polymerization, the slurry containing a polymer produced was filtered to separate a white granular polymer from a liquid phase. The results are set forth in Table 5.

EXAMPLES 13 TO 15

The procedures of Example 12 was repeated except that in "Contact with polar compound", polar compounds given in Table 4 were used instead of o-dichlorobenzene. The results of polymerization are set out in Table 5.

Comparative Example 4

The procedures of Example 12 was repeated except that "Contact with polar compound" was not carried out. The results of polymerization are set out in Table 5.

Comparative Example 5

The procedures of Example 12 was repeated except that in "Contact with polar compound", toluene given in Table 4 was used instead of o-dichlorobenzene. The results of polymerization are set out in Table 5.

EXAMPLES 16 AND 17

The procedures of Example 12 was repeated except that in "Contact with polar compound", trichlorobenzene diluted with decane to a concentration given in Table 4 was used instead of o-dichlorobenzene. The results of polymerization are set out in Table 5.

EXAMPLES 18 AND 19

The procedures of Example 12 was repeated except that in "Contact with polar compound", the solid titanium was contacted with o-dichlorobenzene at temperatures given in Table 4. The results of polymerization are set out in Table 5.

EXAMPLE 20

The procedures of Example 12 was repeated except that in "Contact with polar compound", diphenyldichlorosilane given in Table 4 was used instead of o-dichlorobenzene. The results of polymerization are set out in Table 5.

Comparative Example 6

The procedures of Example 12 was repeated except that in "Contact with polar compound", the solid titanium was contacted with phthalic chloride given in Table 4 instead of o-dichlorobenzene at 70° C. The results of polymerization are set out in Table 5.

TABLE 4

|  | Polar compound | Dipole moment (Debye) | Diluent | Concentration of polar compound (vol %) | Contact Temp. (° C.) | Ti content in solid Ti cat. component (wt %) |
| --- | --- | --- | --- | --- | --- | --- |
| Ex. 12 | o-dichloro-benzene | 1.96988 | — | 100 | 100 | 0.95 |
| Ex. 13 | 1,2,4-trichloro-benzene | 1.02696 | — | 100 | 100 | 0.99 |
| Ex. 14 | 2,4-dichloro-toluene | 1.45658 | — | 100 | 100 | 1.12 |
| Ex. 15 | o-chloro-toluene | 1.14036 | — | 100 | 100 | 1.08 |
| Comp. Ex. 4 | — | — | — | — | — | 2.50 |
| Comp. Ex. 5 | Toluene | 0.26530 | — | 100 | 100 | 1.09 |
| Ex. 16 | 1,2,4-trichloro-benzene | 1.02696 | Decane | 50 | 130 | 0.89 |
| Ex. 17 | 1,2,4-trichloro-benzene | 1.02696 | Decane | 25 | 130 | 0.92 |
| Ex. 18 | o-dichloro-benzene | 1.96988 | — | 100 | 130 | 0.78 |
| Ex. 19 | o-dichloro-benzene | 1.96988 | — | 100 | 70 | 1.11 |
| Ex. 20 | diphenyl-dichloro-silane | 3.78235 | — | 100 | 100 | 1.11 |
| Comp. Ex. 6 | phthalic chloride | 4.58363 | — | 100 | 70 | 0.33 |

TABLE 5

|  | Yield of polymer (g) | | Activity (g-PP/mmol-Ti) | Amount of decane-soluble component (wt %) | | Tm (° C.) | Bulk specific gravity (g/ml) |
| --- | --- | --- | --- | --- | --- | --- | --- |
|  | Granular polymer | Solvent-soluble portion |  | in granular polymer | in the whole polymer |  |  |
| Ex. 12 | 181.96 | 0.1 | 22800 | 0.17 | 0.22 | 164.5 | 0.42 |
| Ex. 13 | 118.75 | 0.0 | 14800 | 0.18 | 0.18 | 164.9 | 0.39 |
| Ex. 14 | 152.90 | 0.1 | 19100 | 0.10 | 0.17 | 163.8 | 0.42 |
| Ex. 15 | 167.45 | 0.1 | 20900 | 0.03 | 0.09 | 164.0 | 0.42 |
| Comp. Ex. 4 | 118.69 | 0.2 | 14900 | 0.45 | 0.62 | 164.3 | 0.42 |
| Comp. Ex. 5 | 147.09 | 0.1 | 18400 | 0.22 | 0.29 | 164.2 | 0.42 |
| Ex. 16 | 114.81 | 0.0 | 14400 | 0.18 | 0.18 | 164.7 | 0.42 |
| Ex. 17 | 93.03 | 0.0 | 11600 | 0.25 | 0.25 | 164.8 | 0.42 |
| Ex. 18 | 141.80 | 0.0 | 17700 | 0.10 | 0.10 | 164.7 | 0.40 |
| Ex. 19 | 150.78 | 0.2 | 18900 | 0.23 | 0.36 | 163.9 | 0.42 |
| Ex. 20 | 178.29 | 0.1 | 22300 | 0.20 | 0.26 | 164.8 | 0.42 |
| Comp. Ex. 6 | 13.03 | 0.0 | 1630 | 0.48 | 0.48 | 164.6 | 0.43 |

What is claimed is:

1. A solid titanium catalyst component comprising magnesium, titanium, halogen and an electron donor and having the following properties (1) the titanium content is not more than 2.5% by weight, (2) the total content of magnesium and halogen is at least 65% by weight and less than 92% by weight, (3) the electron donor content is in the range of 8 to 30% by weight, (4) the weight ratio of the electron donor to titanium is in the range of,6to 40, and (5) said solid titanium catalyst component has a titanium content decrease ratio of less than 15% by weight when washed at 90° C for 1 hour with 100 milliliters of o-dichlorobenzene, per 0.5 gram of solid titanium catalyst component, and said solid titanium catalyst component is substantially free of elimination of titanium when washed at 25° C. for 5 minutes with 500 milliliters of hexane, per 1 gram of the solid titanium catalyst component.

2. An olefin polymerization catalyst comprising:

(A) the solid titanium catalyst component as claimed in claim 1, (B) an organometallic compound, and (C) an organosilane compound having at least one alkoxy group.

3. An olefin polymerization process comprising polymerizing or copolymerizing an olefin in the presence of the olefin polymerization catalyst as claimed in claim 2.

4. A prepolymerized catalyst comprising a prepolymer or precopolymer of an olefin together with (A) the solid titanium catalyst component as claimed in claim 1, and (B) an organometallic compound, and optionally (C) an organosilane compound having at least one alkoxy group.

5. An olefin polymerization process comprising polymerizing or copolymerizing an olefin in the presence of an olefin polymerization catalyst which comprises the prepolymerized catalyst as claimed in claim 4 and optionally (B) an organometallic compound and/or (C) an organosilane compound having at least one alkoxy group.

6. A process for preparing a solid titanium catalyst component which comprises, bringing a solid, titanium-containing component (i) which is obtained by bringing (a) a magnesium compound in a liquid state, (b) a titanium compound in a liquid state and (c) an electron donor, into contact with each other, into contact with a polar halogen-containing aromatic hydrocarbon compound (ii) having a dipole moment of 0.50 to 4.00 Debye, at a temperature of 60 to 160° C. to decrease the titanium content in the solid, titanium-containing component (i) by at least 25% by weight, so as to prepare a solid titanium catalyst component (A) having a weight ratio of the electron donor to titanium in the range of 6 to 40, wherein said solid titanium catalyst component (A) comprises magnesium, titanium, halogen and an electron donor, and has the following properties:

(1) the titanium content is not more than 2.5% by weight, (2) the total content of magnesium and halogen is at least 65% by weight and less than 92% by weight, (3) the electron donor content is in the range of 8 to 30% by weight, (5) said solid titanium catalyst component has a titanium content decrease ratio of less than 15% by weight when washed at 90° C. for 1 hour with 100 milliliters of o-dichlorobenzene, per 0.5 gram of solid titanium catalyst component, and said solid titanium catalyst component is substantially free of elimination of titanium when washed at 25° C. for 5 minutes with 500 milliliters of hexane, per 1 gram of the solid titanium catalyst component.

7. The process for preparing a solid titanium catalyst component (A) as claimed in claim 6, wherein said solid, titanium-containing component (i) is a solid obtained by the process comprising bringing (a) a magnesium compound in a liquid state, (b) a titanium compound in a liquid state and (c) an electron donor into contact with each other to form a first solid and then bringing said first solid into further contact with (b) a titanium compound in a liquid state.

* * * * *